United States Patent [19]
Antoshenkov

[11] Patent Number: 5,664,172
[45] Date of Patent: Sep. 2, 1997

[54] RANGE-BASED QUERY OPTIMIZER

[75] Inventor: Gennady Antoshenkov, Amherst, N.H.

[73] Assignee: Oracle Corporation, Redwood Shores, Calif.

[21] Appl. No.: 277,550

[22] Filed: Jul. 19, 1994

[51] Int. Cl.$^6$ ............................................... G06F 17/30
[52] U.S. Cl. ............................................. 395/604; 395/603
[58] Field of Search ................................. 395/600, 161, 395/603, 604

[56] References Cited

U.S. PATENT DOCUMENTS

| | | | |
|---|---|---|---|
| 3,964,029 | 6/1976 | Babb | 395/600 |
| 4,118,788 | 10/1978 | Roberts | 395/600 |
| 4,255,796 | 3/1981 | Gabbe et al. | 395/600 |
| 4,606,002 | 8/1986 | Waisman et al. | 395/600 |
| 4,677,550 | 6/1987 | Ferguson | 395/600 |
| 4,774,657 | 9/1988 | Anderson et al. | 364/200 |
| 4,811,199 | 3/1989 | Kuechler et al. | 395/600 |
| 4,811,217 | 3/1989 | Tokizane et al. | 395/800 |
| 4,817,036 | 3/1989 | Millett et al. | 395/600 |
| 4,827,462 | 5/1989 | Flannagan et al. | 369/32 |
| 4,829,427 | 5/1989 | Green | 364/300 |
| 4,945,475 | 7/1990 | Bruffey et al. | 395/600 |
| 4,947,320 | 8/1990 | Crus et al. | 364/200 |
| 4,956,774 | 9/1990 | Shibamiya et al. | 364/200 |
| 5,043,872 | 8/1991 | Cheng et al. | 364/200 |
| 5,237,678 | 8/1993 | Kuechler et al. | 395/600 |
| 5,241,648 | 8/1993 | Cheng et al. | 395/600 |
| 5,257,365 | 10/1993 | Powers et al. | 395/600 |
| 5,398,199 | 3/1995 | Lefons | 364/735 |

FOREIGN PATENT DOCUMENTS

92/06440  4/1992  WIPO ............................ G06F 15/40

OTHER PUBLICATIONS

J. Cheng, et al, "An Efficient Hybrid Join Algorithm: A DB2 Prototype", Proceedings of 7th International Conference on Data Engineering (Apr. 1991).

Donald E. Knuth *The Art of Computer Programming, vol. 3/ Sorting and Searching*, Addison Wesley Publishing Company, (USA, 1973),pp. 550–567.

Ashany, Ron, "Application of Sparse Matrix Techniques to Search, Retrieval, Classification, and Relationship Analysis in Large Data Base Systems—SPARCOM", Fourth International Conference On Very Large Data Bases, West Berlin, Germany, Sep. 13–15, 1978, p. 499.

Douglas Comer, "The Ubiquitous B–Tree", *Computing Surveys*, vol. 11, No. 2, Jun. 1979, pp. 121–137.

"Rushmore's Bald Spot", *DBMS*, vol. 4, No. 10, Sep., 1991, p. 58.

Jeff Wincell, "Foxpro 2.0's Rushmore: Here's How FoxPro 2.0's New Technology Speeds Queries", *DBMS*, vol. 4, No. 10, Sep. 1991, pp. 54–59.

Jeff Winchell, "dBASE IV 2.0 Query Innovations: Borland's Latest dBASE Release: On the Forefront of Bitmap Index Optimization", *DBMS*, vol. 6, No. 10, Oct., 1993 pp. 68–71.

*Primary Examiner*—Thomas G. Black
*Assistant Examiner*—Paul R. Lintz
*Attorney, Agent, or Firm*—Lowe, Price, LeBlanc & Becker

[57] ABSTRACT

A computerized query optimizer for use with a database system having an ordered set of records. The optimizer employs a scanner and an evaluator. A query is composed as ranges of record values related by logical operators. The query is converted to a Boolean tree in canonical form. The tree is optimized to express the ranges as a set of disjoint semi-open ranges. The scanner reads a next record from the database. The evaluator, using the query, delivers a logical true or false condition for the record. In addition, the evaluator also delivers an interval of values having the same logical condition as the logical condition of the record. If this logical condition is false, the scanner skips over records having values of the interval, otherwise, if the logical condition is true, records having values of the interval are selected.

10 Claims, 19 Drawing Sheets

| ID | NAME | AGE | ZIP | INCOME | GENDER | |
|----|------|-----|-----|--------|--------|---|
| s0 | s1 | s2 | s3 | s4 | s5 | |
| 3642 | Doe | 32 | 01238 | 60000 | F | ~211 |
| 3643 | Ames | 6 | 12041 | 0 | F | ~212 |
| 3644 | Brown | 80 | 43216 | 12000 | M | ~213 |
| 3645 | Jahadhmy | 32 | 90123 | 15000 | M | ~214 |
| 3647 | Evans | 40 | 45671 | 40000 | F | ~215 |
| 201 | 202 | 203 | 204 | 205 | 206 | |

| Bool Vec 450 | | | | |
|---|---|---|---|---|
| 0 | 1 | 2-3 | 4-5 | 6-7 |
| RANGE = 0 | segment_number | low_rank | high_rank | range_pointer |
| MIXED = 1 | segment_number | N/A | N/A | mixed_pointer |
| SUB-EXPRES-SION = 2 | segment_number | child_pointer | child_number | child_operator |
| IGNORE-ONE = 3 | N/A | N/A | N/A | N/A |
| IGNORE-ALL = 4 | N/A | N/A | N/A | N/A |

Fig. 4B

| Segment Vec | | | |
|---|---|---|---|
| Segment | Range Predicate | Mixed Predicate | Limit_Key |
| s0 | 3 | 2 | 0 |
| s1 | 2 | 1 | 0 |
| ⋮ | ⋮ | ⋮ | 0 |
| sN | 1 | 1 | 0 |

*Fig. 6*

| Range Vec | | |
|---|---|---|
| Predicate | Low_Value | High_Value |
| s0,r0 | 3640 | 3647 |
| s0,r1 | 4326 | 4370 |
| s0,r2 | 4500 | 6000 |
| s1,r0 | 30 | HV |
| ⋮ | ⋮ | ⋮ |
| sN,rN | 20,000 | 21,999 |

Fig. 7

| Node | Level | Opr | Type | Segmnt | Prange | Nrange | dNode |
|------|-------|-----|--------|--------|---------|--------|-------|
| n0 | 0 | OR | subexp | | | | n1:n1 | 1101
| n1 | 1 | AND | subexp | | | | n2:n3 | 1102
| n2 | 2 | OR | subexp | | | | n4:n5 | 1103
| n3 | 2 | OR | pred | s1 | p0 | | | 1104
| n4 | 3 | AND | range | s0 | [k0:k1) | | | 1105
| n5 | 3 | AND | subexp | | | | n6:n7 | 1106
| n6 | 4 | OR | range | s1 | [k0:k1) | | | 1107
| n7 | 4 | OR | range | s1 | [k2:k3) | | | 1108

| Key | s0 | s1 | s2 | Key Value | Limit_key | Evaluate |
|-----|----|----|----|-----------|-----------|----------|
| k0  | 0  | 0  | 0  | T | 0 1 0     | YES |
| k1  | 0  | 0  | 1  | T |           | NO  |
| k2  | 0  | 2  | 2  | F | 0 10 11   | YES |
| k3  | 0  | 2  | 3  | F |           | NO  |
| k4  | 0  | 4  | 4  | F |           | NO  |
| ... | ...| ...| ...| ...| ...      | ... |
| k9  | 0  | 8  | 9  | F |           | NO  |
| k10 | 10 | 10 | 10 | F | 10 10 11  | YES |
| k11 | 10 | 10 | 11 | T | 10 10 12  | YES |

*Fig. 14*

SEGMENT_FLAG

| 0 | 0 | 0 | 0 | 0 | 0 | 0 | 0 | 0 | 0 | 0 | 0 | 1 | 0 | 0 | 0 |

1610

SEGMENT_MASK

| 1 | 0 | 0 | 0 | 0 | 0 | 0 | 0 | 0 | 0 | 0 | 0 | 1 | 1 | 1 | 1 |

| Key | s0 | s1 | s2 |
|---|---|---|---|
| Key0 | 20 | 0 | 7 |
| Key1 | 50 | 10 | 11 |
| Key2 | 110 | 5 | 0 |
| . | . | . | . |
| . | . | . | . |
| . | . | . | . |
| Key99 | 800 |  | 12 |

RANGE-BASED QUERY OPTIMIZER

FIELD OF THE INVENTION

This invention relates generally to digital computers, and more particularly to systems and methods for optimizing queries used with databases systems.

BACKGROUND OF THE INVENTION

A database system is a computerized record keeping system which allows a user of a database to manipulate information. One type of database which has gained popularity because of its ease-of-use and simple structure is a relational database. Consider the ubiquitous spread-sheet.

In a relational database, the relationships of the data are usually maintained in a table having rows and columns. The rows organize instances of related data, and the columns group data having common characteristics or attributes.

The operation of locating data in the database is called a query. Typically, queries are expressed in a query language, for example a standard query language (SQL). The statements of the query language set out the search criteria in logical or "Boolean" expressions. A simple query for a census database could be paraphrased as: locate all persons having an income in the range of $20,000 to $30,000. In this statement, the attribute of the subject persons to be examined is "income," the logical condition to be satisfied is "between", and the values which must satisfy the logical condition are in the range of 20000 to 30000.

In a query, the expressions which determine the search criteria are called predicates. Most predicates in queries are phrased in terms of a range of values, for example greater than, less than, between, etc. These type of predicate relationships are called RANGE predicates. Other type of query specifications, for example mathematical relationships, are called non-RANGE predicates.

In a query, range, and non-RANGE predicates can be related by logical operators such as AND, OR, and NOT. During processing of the query, if a particular value falls within the specified range, a logical true condition is returned for the predicate, otherwise a false condition is returned. The true and false conditions of all query predicates can be combined to determine which data are selected from the database.

Processing queries is a frequent, and often time consuming task since the database system can include a large amount of data, and a given query may need to retrieve data from different portions of the database. A recurring problem in the design of database system is to make the processing of queries more efficient.

One way to locate data is to sequentially scan the rows of the table, e.g., the records of the database, for the attribute values which satisfy the search criteria. This is known as a table scan, because the relationship table is scanned from beginning to end. Although the table may imply that the rows storing related data are in sequential order, in fact, the dam may be spread-out randomly over multiple storage devices. Therefore, table scans are generally inefficient and time consuming.

In most database systems, a separately maintained index structure is used to facilitate the locating of records of data. The index includes keys having values and addresses. The keys, corresponding to records, are usually stored in a selected order of their values, and the addresses correspond to physical locations of the disk blocks and memory pages where the data associated with the key are stored. If the keys of the index are constructed from several database attributes or columns, the key is called a compound key, and the individual portions of the key corresponding to the several attributes are called key "segments."

One method of organizing an index is a B-tree with a "root," intermediate "branches" and interior nodes depending from the root, and "leaves" depending from the end of branches. The term B-tree is short for "balanced tree," and refers to the roughly equal number of branches which depend from the root and intermediate branches, and the uniform or balanced distribution of the leaves among the branches. The leaves correspond to the actual index entries storing key and address data.

A particular index entry can be found by following the branches from the root to the desired leaf. For example, to scan the rows of a relational table in a selected index order, the leaves are scanned sequentially, and the index entries at the leaves are used to locate the rows of the database.

When an index scan is used to find keys, the search for data which satisfy the query conditions can be performed more efficiently than for a table scan. For example, prior to scanning the B-tree, it could be determined that certain branches do not include any leaves which satisfy the search criteria. The searching of the leafs of such branches can be skipped in their entirety to speed up the querying process.

Most prior art database systems have included a component called a query optimizer. The query optimizers transforms a given query into an equivalent optimized query which may be processed more efficiently than the given query. The design of a query optimizer is complex, and is made more so by the fact that certain factors which influence the optimizing transformation are not known until the query is actually processed.

Range optimizers extract true and false ranges of key values from the query expression. Only those branches which include keys within the true range are scanned. Branches with key values in the false ranges are skipped as if they were "pruned" from the B-tree. However, if the query includes multiple conditions, the true and false ranges may overlap so that the scan of the index is less than optimal. Also, the values of the predicates of the queries are frequently expressed in terms of variables which are only resolvable when the query is processed.

In another type of query optimizer, the query is rearranged according to the frequency of true evaluations of the underlying query predicates in order to decrease the average length of time required for Boolean evaluation and consequently for scanning the index. However, range optimization is usually substantially more efficient than scanning according to frequencies because it reduces the number of physical accesses to the dam, and because most queries are phrased in terms of range conditions.

Understandably, there is a need for a query optimizer which can process a query having multiple ranges more efficiently. Furthermore, the optimizer should be able to optimize queries which include values which are expressed as variables. Furthermore, the optimizer should further reduce processing time by eliminating unnecessary physical accesses of the data while executing of the query. The invention satisfies these objectives.

SUMMARY OF THE INVENTION

This invention provides a method for scanning and evaluating records of a database according to a query composed as an arbitrary Boolean restriction or selection criteria. The invention determines the near-largest interval for which the selection criteria is always false and avoids scanning the corresponding portion of the database. Also, within any interval of values for which the selection criteria is always true, evaluation of the records is not necessary, since the records satisfy the selection criteria.

The technique uses a computerized query optimizer. The database is organized as an ordered set of records. The optimizer employs a scanner and an evaluator. A query is composed as ranges of record values related by logical operators. Prior to scanning and evaluating the records of the database, the query is converted to a Boolean tree in canonical form. The tree is optimized to express the ranges of values as a set of disjoint semi-open ranges. Overlapping ranges related by the logical AND operator are collapsed into a single intersecting range. Similarly, ranges related by the OR operator can be expressed as a union of ranges.

The scanner reads a next record from the database. The evaluator, using the selection criteria, delivers a logical true or false condition for the record. In addition, the evaluator also delivers an interval of values having the same logical condition as the logical condition of the record. The interval includes the value of the record, and a high limit value of the interval. If the logical condition of the record is false, the scanner skips over records having values of the interval. That is, records having values in this interval do not need to be read or evaluated. Otherwise, if the logical condition is true, records having values of the interval are selected without requiring individual evaluation of the record values with respect the selection criteria.

In an alternative embodiment, the invention is applied to records having values which are a concatenation of several record attribute values or segments. In this embodiment, a partial logical evaluation of the attribute values is performed in the same order that the segments or attributes are concatenated. As the partial logical conditions are delivered, the technique determines if the partial logical condition of the segment is definite for the entire record value. If this is true, the logical condition of the entire records value is immediately known and evaluation of the remaining segments is not require&. Otherwise, additional attribute values are evaluated until a definite logical condition can be determined. For each segment, a near-largest interval is maintained to accelerate the selection of records.

BRIEF DESCRIPTION OF THE DRAWINGS

FIG. 2A shows a relational table of a portion of a database stored in the computer system of FIG. 1;

FIG. 4B is a table showing the structure of nodes of the tree of FIG. 4A;

FIGS. 6–9 show block diagrams of vectors used during the processing of the tree of FIG. 4;

FIG. 11 illustrates in tabular form the structure of the tree of FIG. 10;

FIG. 14 is a table showing values processed by an example query;

FIG. 16 is a block diagram of bit vectors used during Boolean evaluation; and

FIG. 17 shows a sparse index in tabular format.

DETAILED DESCRIPTION OF PREFERRED EMBODIMENTS

Figure 1:
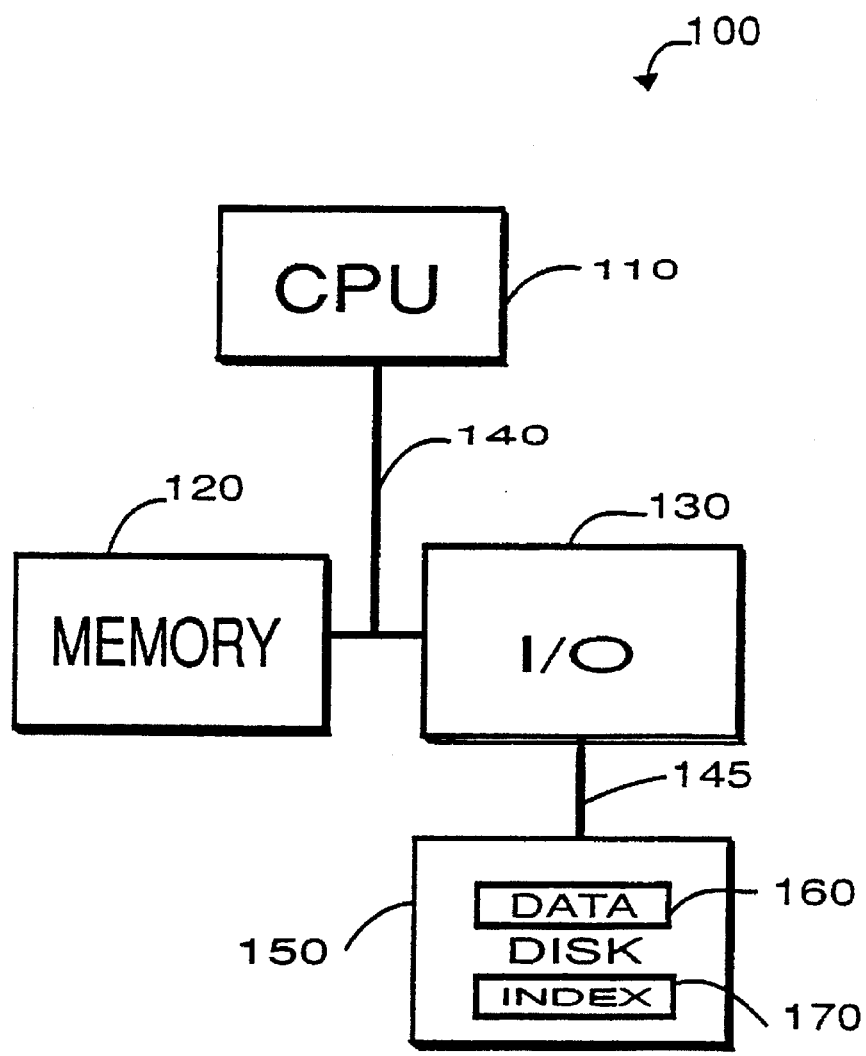
FIG. 1 shows a block diagram of a computer system in which the query optimizer of the invention may be implemented.

FIG. 1 shows a computer system 100 including a central processor unit (CPU) 110, a memory 120 and I/O sub-system 130 connected to each other by a communications bus 140. A bulk storage device 150, for example a disk, can be connected to the I/O sub-system 140 by an I/O bus 145.

During operation of the computer system 100, the CPU 110 processes data stored in the memory 120 using instructions also stored in the memory 120. The data stored in the memory 120 may be part of a larger collection of organized data stored in the disk 150 as a database 160. The database 160 can be accessed by an index 170.

FIG. 2A shows a portion of the database 160 to be processed by the computer system 100 of FIG. 1. Although the invention may be practiced with many styles of databases, the preferred embodiment of the invention is described in terms of an easily understandable relational database.

In the relational database 160, the data are simply organized in a tabular format, for example table 200. The portion of the database shown in table 200 includes columns 201–206and rows 211–215. The columns 201–206 store data sharing a common characteristic or attributes, and the rows 211–214 store instances or records of related data which can be associated with the attributes of the columns.

For example, the table 200 includes census information about a group of people. The attributes of the census data, organized in columns 201–206, may include, respectively, an identification number (ID), NAME, AGE, postal code (ZIP), INCOME, and GENDER. The records of data related to individual people are organized in rows 211–215. For example, row 215 stores data about a forty year old female named Evans living in ZIP 45671 and having an ID 3647, and an income of $40,000.

One frequently performed task by the computer system 100 is to locate data in the database 160 according to given selection criteria. For example, only locate female individuals within a given age and income range. A substantial amount of time and costly system resources, for example, physical disk I/O operations, can be consumed while locating qualifying data in a very large database.

Figure 2B:
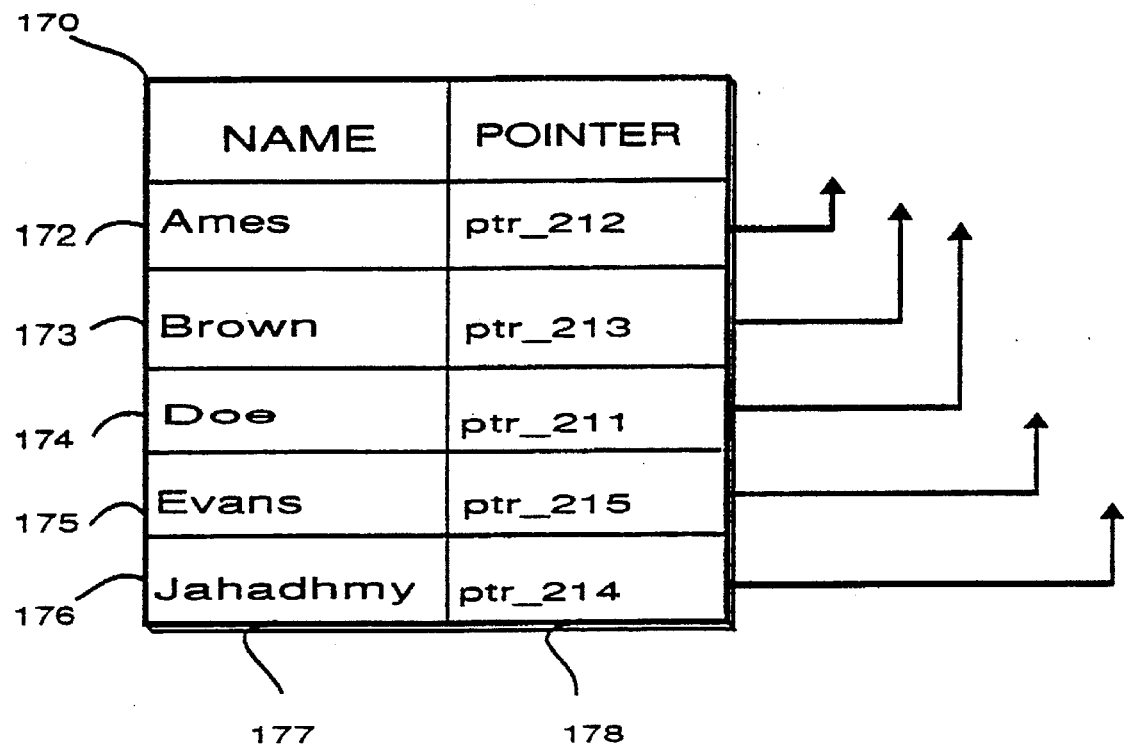
FIG. 2B illustrates an index for the relationship table of FIG. 2A.

In order to minimize the I/O operations while locating data, most databases include indices, for example, index 170 of FIG. 1, a portion of which is shown in tabular format in FIG. 2B. Indices provide high speed, direct access paths to the data. A simple well know index structure is a B-tree. In a B-tree, the "keys" to the database are the attributes or columns. Advantageously, B-trees can maintain keys in a predetermined order without requiring any sorting of the index. For example, the keys of index 170 are maintained in ascending alphabetical order.

For example, for the table 200, the index 170 is accessible by the key "NAME" to locate specific records by the name of the person, column 177. Pointers to the physical location where the data are stored in the database are maintained as indicated in column 178.

Index keys may also be constructed by concatenating several attributes, for example, ID_NAME_AGE. When keys are combined in this manner, the key is known as a "compound" key, and the concatenated portions of the key are called key segments, or simply segments. With reference to FIG. 2A, if the key "segments" ID, NAME, ..., and GENDER, are segments s0, s1, ..., and s5, then the compound key ID_NAME_AGE could be expressed as the concatenation s0_s1_s2, where "_" indicates concatenation.

Although the preferred embodiment of the invention assumes indices structured as B-trees with segmented keys, it will become apparent, that the invention can also be used with databases having other types of underlying index structures, for example vectors or linked lists. Alternatively, the invention can be applied to any organized data structure having records ordered according to some record value. The record value being either singular values or a concatenated compound value.

Figure 3:
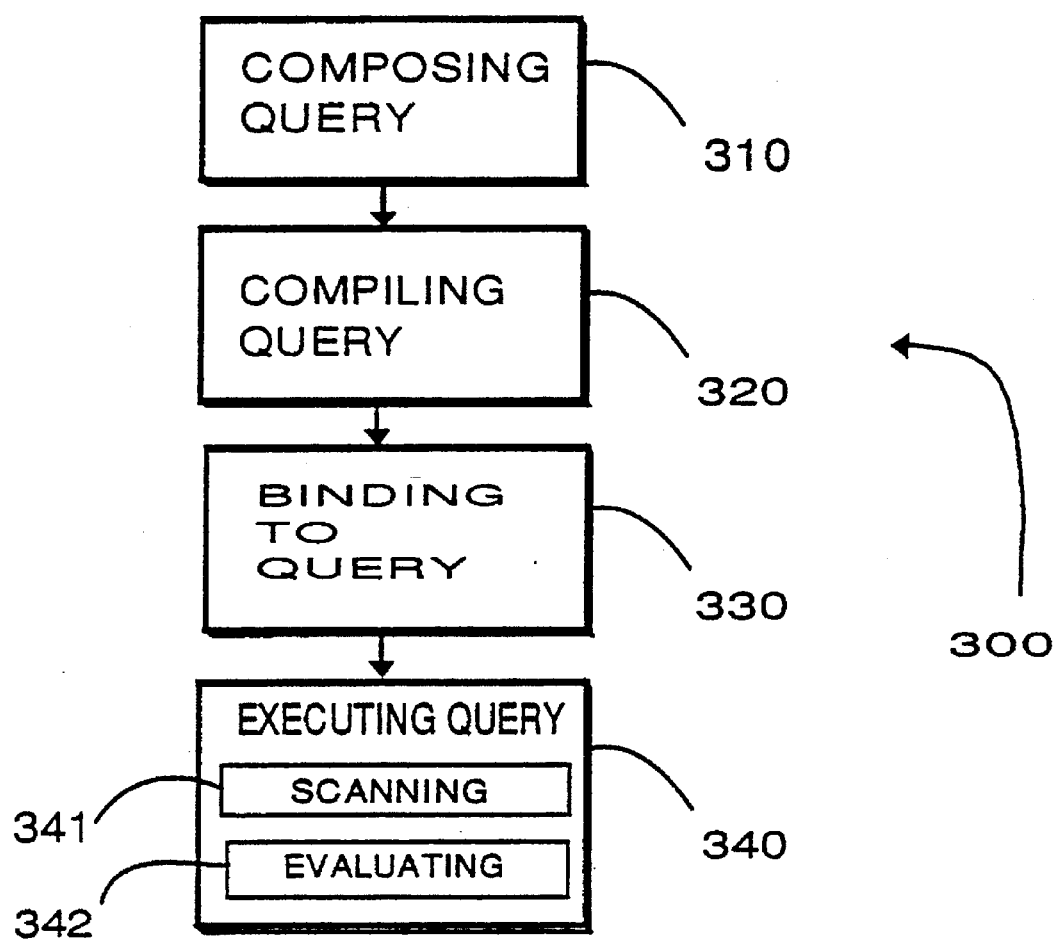
FIG. 3 is top level flow diagram of a query processing method used with the system of FIG. 1.

The principles of the invention will now be introduced with reference to FIG. 3. A more detailed description of a preferred embodiment of the invention follows with reference to the subsequent Figures. In general, the queries to the database are processed in distinct phases or stages, namely composing, compiling, binding, and executing the query, steps 310, 320, 330, and 340 of FIG. 3, respectively. Preferably, query optimization is done during the compiling, binding, and executing phases of query processing.

Design Overview and Introduction

A conventional index "I" for the database may be accessible by a compound key. A compound key of the index is a concatenation of any of the key segments s0, s1, ..., sN, the segments corresponding to the attributes, or columns of the database. A query or Boolean restriction "B" may be represented as a data structure in canonical form, e.g., a Boolean tree. In a Boolean tree, the logical operators are interior nodes, and the predicates are leaf nodes of the tree.

Composing Phase Summary

In FIG. 3, in step 310, a query is composed by a user of the database using, for example, an editor or an on-line selector, see below. The query can be composed in the form of a query language, for example, standard query language (SQL). Typically, a query combines attributes and restriction in expressions or "predicates" that are evaluated to select specific items from the database. The attributes can be segmented keys, and the restrictions can be expressed as logical or other relationships. For example, AGE between 21 and 65, and GENDER female.

For the purpose of this description, the attributes and their associated restrictions are classified as "range" predicates if the restriction is some range or range of values. Range restricting operators include, for example, equal "=", greater ">", less "<", and their combinations. Logical operators which can be used with range restricting operators include, for example, AND, OR, and NOT. Non-range restrictions can include other type of operators, such as arithmetic operators, add "+", subtract "−", multiply "*", and the like. For example, INCOME=AGE * 10,000, or the "LIKE" operator.

If the query is composed by a specialized front-end process, for example, a graphic user interface, items can be selected simply by "clicking" a mouse on specific displayed items while browsing through the index or ancillary databases. Thus, it is easy to compose a query having hundreds of mostly range producing predicates. Optimizing these complex queries for execution is an important task so that data can be located in a reasonable amount of time.

Compiling Phase Summary

In step 320, the query is compiled into machine executable query code which can be processed by the CPU 110, and data structures which can be stored in the memory 120. In the preferred embodiment of the invention, the code and data structures are optimized to decrease CPU utilization and I/O operations.

The Boolean tree may be transformed to some easy to handle canonical form. For example, all logical NOT operators are pushed down from interior nodes to bottom level nodes, simply referred to as "leaf" or predicate nodes. All adjacent AND logical operators on leaf nodes are grouped under a common "parent" or sub-expression node. OR operators are grouped similarly. Sibling nodes having a common parent node are maintained in a spatially adjacent relationship to facilitate node manipulation. Sibling AND nodes have an ORed parent, and child nodes of an AND parent are grouped by the OR operator. All range producing predicates are converted to "semi-open intervals" having a "closed" lower value and an "open" high value or AND/OR expression on such semi-open intervals.

In addition to the data structure representing the tree, secondary data structures, in the form of vectors, may be created during the compile phase. The vectors facilitate further manipulation of the tree for optimization purposes.

A segment vector is created with one entry for each key segment in the query. The segment vector stores information specific to each of the key segments composed in the query, for example, the number of predicates that use the segment.

Entries in a range vector store the low and high values of the ranges of the segments. If these values are expressed as constants, they can be "bound" to the segment during the compiling phase. Otherwise, if they are expressed as variables, they are stored in the range vector during the subsequent binding phase.

A mixed vector has entries storing information needed to process the mixed predicates of the query, for example, the memory address of the associated machine executable code.

A sorted rank vector contains pointers to all the ranges in the range vector. As will be described herein, key evaluation according to the principles of the invention is by range "rank" instead of actual range values as in traditional query optimizer methods. Evaluating keys by rank simplifies and speeds up key evaluation greatly.

The Boolean tree is maintained as a vector (BoolVec) stored in the memory 120. In order to facilitate the manipulation of the tree, the data structure representing the tree is kept small. For example, during compiling, information describing each node of the tree can be stored in eight bytes. The secondary data structures, also in the form of vectors, can also be stored in the memory 120.

Binding Phase Summary

In step 330, the run-time values of the keys are "bound" to the machine code and data structures created in the compiling phase. If the query only contains segments and constants, this can be done during the compiling phase. In addition, prior to executing the query, each range is evaluated.

For example, if a range evaluates to an "empty" or "all-inclusive" range, this condition can be propagated up the nodes of the Boolean tree as a definite TRUE or FALSE logical condition. Sometimes perhaps, proving the entire tree to be TRUE or FALSE, in which case, the step of executing the query is not required. The results of the evaluation are placed in the range vector. The rank vector is sorted by the range values, and each range is given a "rank" number. Further processing of the predicate ranges is by the rank number, and not the range values, greatly improving processing performance.

For example, the "rank" numbers can be stored as easy-to-manipulate two byte integer values, whereas traditional manipulation of the range values may require slow-to-execute character suing manipulation instructions. Then, using simple rank comparisons, as described in further detail below, the data structure of the Boolean tree is further optimized. Sibling nodes are sorted by segment number and low range rank. Among sibling nodes, all ORed ranges for the same segment are transformed into a single non-intersecting ascending set of ranges. And, for sibling nodes, all ANDed ranges are collapsed into a single range.

Unlike traditional value binding optimization, which delivers either one range, or a range list of keys, the optimization according the present invention delivers a Boolean tree with many range lists for the key segments. This arrangement covers a much broader ground of arbitrary Booleans, thus, simplifying the optimization.

Executing Phase Summary

In step 340, the query is "executed" by the CPU 110 to locate the qualifying data of the database. Execution of the query is further optimized in step 340 to minimize the number of processing steps, particularly I/O operations, needed to locate the data falling within the specified restrictions. Executing the query involves two interactive sub-processes, scanning 341 and evaluating 342. The scanning sub-process scans the index according to the Boolean tree as constructed above, and delivers key segments in response to "get-next-key" requests. Keys delivered by the scanning component are passed to the evaluating sub-process. If the key satisfies the query restriction, a TRUE logical condition is returned, otherwise, if it does not, a FALSE condition is returned.

In addition to the "logical condition" of the key, e.g. the Boolean value, the evaluating component also returns a "limit_key" key having a computed value. The "limit_key" key is used by the scanning process to optimize the scanning of the index for key rages that have a "constant" logical condition, CONSTANT meaning that the logical condition for all keys over the range from the current key to the limit_key is the same, either all TRUE, or all FALSE.

If the current key delivered by the scanning component is evaluated as FALSE, the "get-next-key" request delivers the next key having a value greater than the value of the limit_key, thus eliminating many I/O operations. If the current key evaluates as TRUE, a sequence of keys are delivered by the scan component. The value of each is key is compared with the value of the current limit_key. If the value is less than the current limit_key value, the next key is requested. Otherwise, if the value of the next key in the delivered sequence is greater than the current limit_key value, the key is evaluated.

The Boolean evaluation, as described in detail below, is done by attending to each segment of the compound key individually, first segment s0, then s1, and so forth. For each segment, intermediate TRUE and FALSE results of the evaluation are stored in the nodes which involve predicates referencing this segment, as, for example, "0" and "1" bits. The TRUE and FALSE conditions are propagated up the tree, until the entire tree has been evaluated. By evaluating the segments individually, efficient key limit calculation can be done during the same traversal of the tree for Boolean evaluation.

The particulars of the optimization of a preferred embodiment of the invention during each of the major stages is now described in greater detail, beginning with the compilation step 320 of FIG. 3.

An index "I" exists for a relational table "T". The keys of the index are sorted in a low-to-high, or left-to-right alphabetical order. Each key of the sorted index I is a concatenation of attributes or segments "s0, s1, . . . , sN" of the relational table "T".

A query may be a Boolean expression "B" referencing any of s0, s1, . . . , sN, but no other attributes of the table T for which the index I is defined. At the time of evaluation of the Boolean B, or earlier, all variable values supplied directly by the user, attributes external to the table T, and constants are available. This earliest time of value availability is called the value binding time.

Following SQL convention, the Boolean B may contain only the AND, OR, and NOT logical operators applied to each other and to two kinds of predicates, range-producing predicates (RANGE predicates), and non-range producing predicates (MIXED predicates).

RANGE predicates include:

a) any comparison of one of the segments s0, s1, . . . , sN with any expression not containing attributes of the table T;

b) any segment s0, s1, . . . sN between e1 and e2, where e1 and e2 are any expressions not containing attributes of T;

c) any segment s0, s2, . . . , sN in the set {x1, x2, . . . , xK}, where x1, x2, . . . , xK are expressions not containing attributes from T; and d) any segment s0, s1, . . . , sN like x where x is a string expression not containing attributes of T, and, after evaluation, delivering a string which starts with one or more authentic characters.

Mixed predicates are any other predicates. In practical situations, a substantial majority of predicates used in relational queries are RANGE predicates, and, therefore, range-based Booleans represent an important target for index scan optimization.

Optimization of the Compiling Phase

During the compiling step 320 of FIG. 3, the query is transformed to canonical form, e.g. a data structure representing the query in the form of a Boolean tree. The Boolean tree can be stored in the memory 120 of FIG. 1 as a data structure in the form of a vector. In a preferred embodiment of the invention, the information describing each node of the tree is stored in spatially adjacent eight byte fields. The Boolean tree is reduced to a canonical form by applying the following general logical principle to the expressions of the query.

All NOT logical operators of the query may be eliminated by applying the well-known De Morgan's law which inverts logical comparison operators, and by reversing logical AND and OR operators where necessary.

For example, if s1 and s2 represent arbitrary attributes or key segments having values u and v respectively, then:

NOT(s1=u AND s2>v) becomes NOT(s1=u) OR NOT (s2>v)),

NOT(s1=u OR s2=v) becomes NOT(s1=u) AND NOT (s2=v)),

NOT(s1=u) becomes (s1<u) OR (s1>v), and

NOT(s2>v) becomes (s2≦v), and so forth, thus eliminating the NOT operators.

Figure 4A:
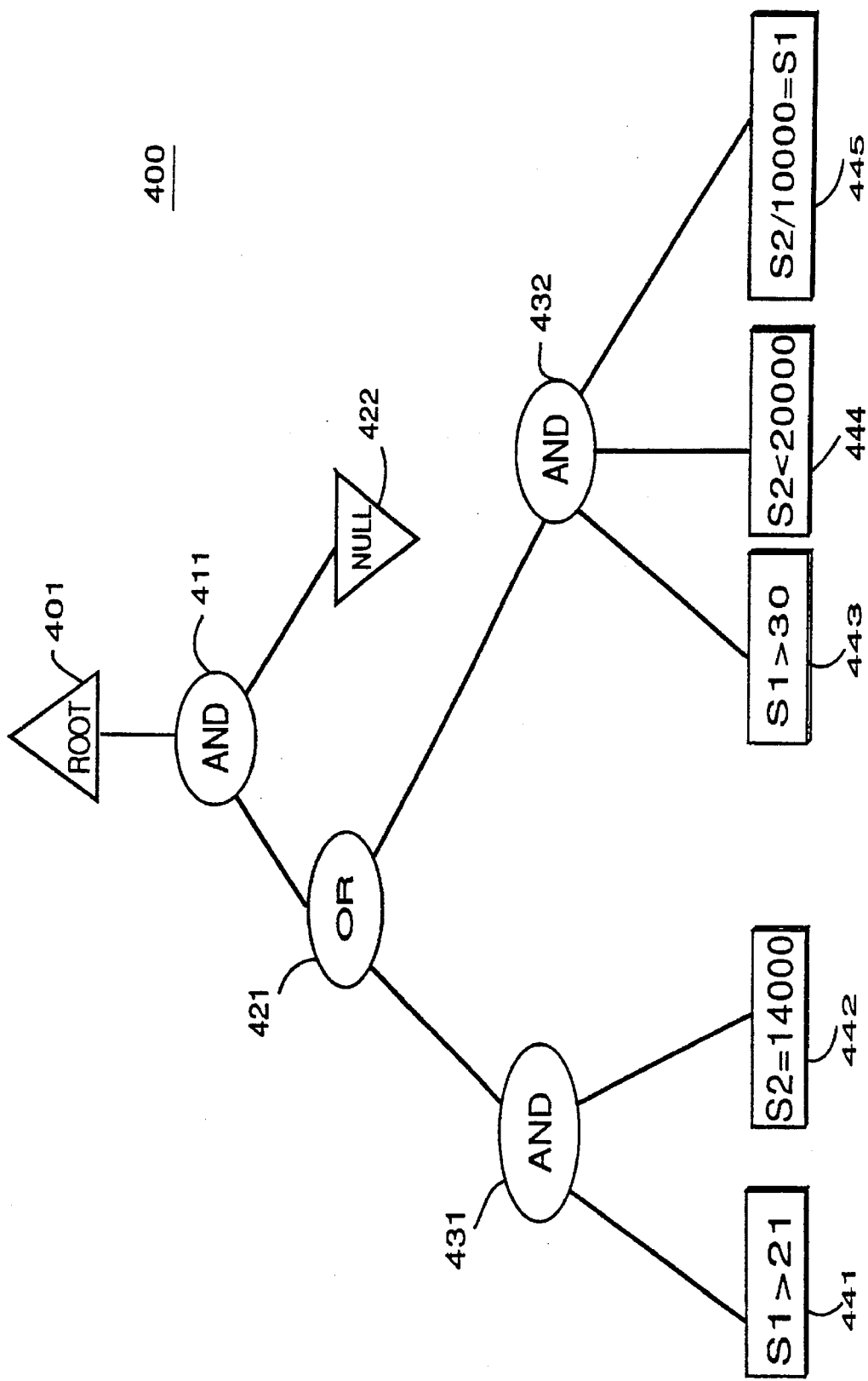
FIG. 4A shows a query to be optimized in the form of a tree diagram.

FIG. 4A shows in a conventional "up-side-down" manner an example of a Boolean tree (BoolTree) 400 which has been constructed from the following query:

$((s1>21)$ AND $(s2=14000))$ OR NOT $((s1 \leq 30)$ OR NOT $(s2>20000)$ OR $(s2/10000 \neq s1))$, where s1 and s2 are arbitrary attributes of the relationship table 200. For example s1 and s2 represent the attributes AGE 103 and INCOME 105. The BoolTree 400 includes a root node 401, an AND node 411 at a first level. There is an OR node 421 and an artificial NULL node 422 at a second level. At a third level, there are AND nodes 431 and 432. At a fourth level are leaf nodes 441-445.

Leaf nodes 441-442 are sibling nodes of parent AND node 431, and leaf nodes 443-445 are sibling nodes of parent AND node 432. Leaf nodes do not have children nodes. The OR node 421 is the grand-parent node to the leaf nodes 441-445. All nodes between the root node and the leaf nodes, represent logical operations and will be referred to as "sub-expression" nodes.

The BoolTree 400 represents the query expression as transformed by the above stated rules. The BoolTree 400 has been reduced so that all nodes at the same level, counting from the root 401, are connected by the same operator, either an AND operator (conjunction) or an OR operator (disjunction). All nodes at adjacent levels of the BoolTree 400 are connected by different operators.

If the nodes at one level are disjunctively connected by OR operators, the nodes at the higher and lower adjacent levels are conjunctively connected by AND operators. Any AND parent node has its children nodes connected by OR operators, and the children of OR parents are connected by AND operators. All parent nodes have at least two children nodes.

The artificial root node 401 and the NULL node 422 are created to simplify the detection of the top of the BoolTree 400 when the tree is ascended. For example, by having the root node 401, and the conjunctive AND node 411, it is guaranteed that every leaf node has a grand-parent node. Thus, during evaluation of the query, ascent of the tree can always proceed two levels at once from any leaf node. To achieve efficiencies during subsequent transformations of the tree, parent nodes and their siblings are placed spatially adjacent in memory 120. This eliminates the need for sibling pointers and improves processing by, for example, better utilizing hardware cache pre-fetching from the memory 120.

FIG. 4B, in tabular form, shows a preferred data structure for the BoolTree 400 of FIG. 4A. The data structure is in the form of a vector 450, the fields of the vector representing the nodes as described above.

Each field is maintained as eight bytes. N row 460, bytes 0,1, 2-3, 4-5, 6-7, the eight bytes allocated to sub-fields, organize the information describing the nodes. In actual practice, the sub-fields may overlap byte boundaries to facilitate data manipulation and to ensure that all of the sub-fields can be maintained in a fixed length eight byte structure.

The first sub-field, column 451, of each node field is used to store the node type. The node types can be defined as RANGE, MIXED, SUB-EXPRESSION, IGNORE-ONE, and IGNORE-ALL, stored as values 0-4, respectively, in the node_type field. The last two types of nodes IGNORE-ONE and IGNORE-ALL are special types of SUB-EXPRESSION nodes created during tree optimization to eliminate nodes having "all TRUE" or "all FALSE" conditions, described in further detail below.

For range leaf nodes, row 461 (RANGE), e.g., nodes having no children, the second sub-field, column 452 indicates the sequential segment number (segment_number) of the key segment encoded in the node. For example, 0 represents segment s0, 1 represents segment s1, and so forth.

The third sub-field, column 453 stores a low_rank for the segment. The low_rank can be expressed as integer values 0 to n, similar to the numbering of ranks. The fourth sub-field, column 454, stores a high_rank for the segment, also as an integer value. The fifth column 455 stores a pointer range_pointer which points to a range vector where the actual values of the range are stored.

For MIXED leaf nodes, row 462 (MIXED), also childless, the second sub-field segment_number indicates the highest segment referenced by the node's predicate. The third and fourth sub-fields are not used in MIXED nodes. The fifth sub-field is a "pointer" (mixed_pointer) to a data structure encoding the MIXED predicate. This pointer is also in the form of an off-set in a vector (MixedVec) described below.

For sub-expression parent nodes, row 463 (SUB-EXPRESSION), e.g. they always have children nodes, the second sub-field stores the number of the highest segment referenced in the node, or any of its children nodes. The third sub-field, child_pointer, points to the first child of this parent. The pointer is in the form of an off-set in the BoolVec 450 to conserve storage space. The fourth sub-field, child_number, stores the number of children of this parent node. The fifth sub-field, child_operator, stores a code representing the logical comparison operation to be performed on the children, e.g. AND or OR.

Once a node has been converted to an IGNORE-ONE (type 3), or IGNORE-ALL (type 4) for optimization, the other sub-fields of the node are not used, since the node will be eliminated or "pruned" from the tree.

Transforming the query expression to a Boolean tree has the advantage that the number of logical decision making steps is reduced to a minimum while searching the database. Furthermore, once the TRUE and FALSE conditions for the individual attributes have been determined, the qualifying data can quickly be selected from the database.

During compilation of the query, as a further optimizing step, range producing values are transformed into a unionized and intersected set of ranges expressed as semi-open intervals. A semi-open range is described with reference to FIG. 5.

Figure 5:
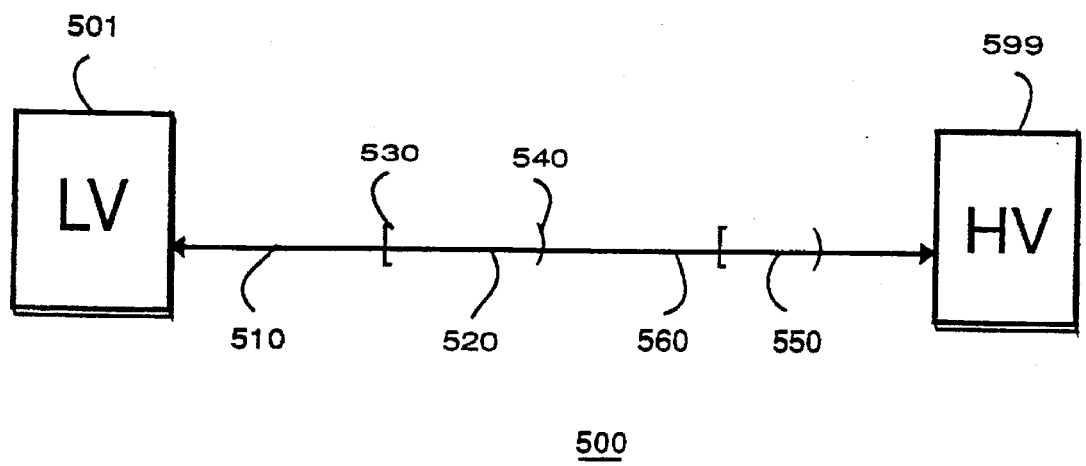
FIG. 5 is a line diagram of a semi-open range.

In FIG. 5, the line 500 represents all the possible values for a particular key segment, for example, segment s0. The line portion 520 between the inclusive symbol "[" 530 and the exclusive symbol ")" 540 is designated a semi-open interval. All key segment values in the semi-open range 520 are equal to or greater than the values at the closed symbol "[" 530, but less than the value at the open symbol ")" 540. The line portion 550 can represent another range, and the line portion 560 between ranges 520 and 550 represent a "gap" range, for which no range restrictions are specified. The semi-open intervals can partition all the possible values into a set of disjoint ranges.

For example:

s1=u produces s1[u:u')

s1<u produces s1[LV:u)

s1>u produces s1[u':HV)

s1 NOT IN {x1, x2, . . . , xK} produces s1([LV:x1)| [x1':HV))& . . . &([LV:xK)|[xK':HV))

where:

"u" is an arbitrary value;

"'" denote the next immediately following value;

"x1, x2, . . . , xK" are arbitrary expression; and

"LV" and "HV" denote the absolute low and high values possible for the segment; and where:

"|" is the unionization operator;

"&" is the intersection operator; and

":" means all intervening values.

After this conversion, the Boolean B, e.g., the query, becomes an ANDing and ORing of range and MIXED predicates. Each RANGE predicate concerns itself only with a single key segment, whereas mixed predicates can reference multiple segments.

As shown in FIGS. 6, 7, 8, and 9 additional dam structures, in the form of vectors, are created in the memory 120 to facilitate further optimization and processing of the BoolTree 400. The data structures illustrated by the FIGS. 6–9 are SegmentVec 600, RangeVec 700, MixedVec 800, and RankVec 900.

First, there is a description of the segment vector (SegmentVec) 600. For each key segment s0, s1, . . . , sN, there is a segment vector entry, for example, the rows 601–603. The first value of each segment vector entry, for example column 620, stores the number of RANGE predicates where the segment is used. The second value, column 630, stores the number of MIXED nodes where the segment is used. For example, in an arbitrary Boolean, the segment s0 appears in three RANGE predicates and two MIXED predicates. The RANGE and MIXED predicates of each segment can be designated as, for example, r0, r1, r2, and p0, p1, respectively, and so forth.

For MIXED predicates, the count is stored in the highest one of the segments referenced in the predicate. This enables the iterative partial evaluation of MIXED predicates when all segments needed for the evaluation are available. Knowing the number of RANGE and MIXED predicates, permits the allocation of storage space for the other three types of vectors. For each segment a "limit_key", see row 640, is also maintained in the SegmentVec 600. The use of the limit_key is described in greater detail below.

As shown in FIG. 7, for each of the RANGE predicates, e.g., column 710, of each segment, e.g., r0, . . . , rN, an entry in a range vector (RangeVec) 700, is maintained, for example the rows 701–705 of FIG. 7. The first value of each vector, column 720, stores the low value (low_value) of the range or semi-open range. The second value, column 730, stores the high value (high_value) of the range.

The low and high values of the semi-open ranges are placed in the RangeVec 700 when values are bound, unless they are constants, in which case they can be bound during compilation of the query. In the example RangeVec 700, the ranges s0, s1, and sN can represent the attributes ID, AGE, and INCOME of FIG. 2A, respectively.

Figure 8:
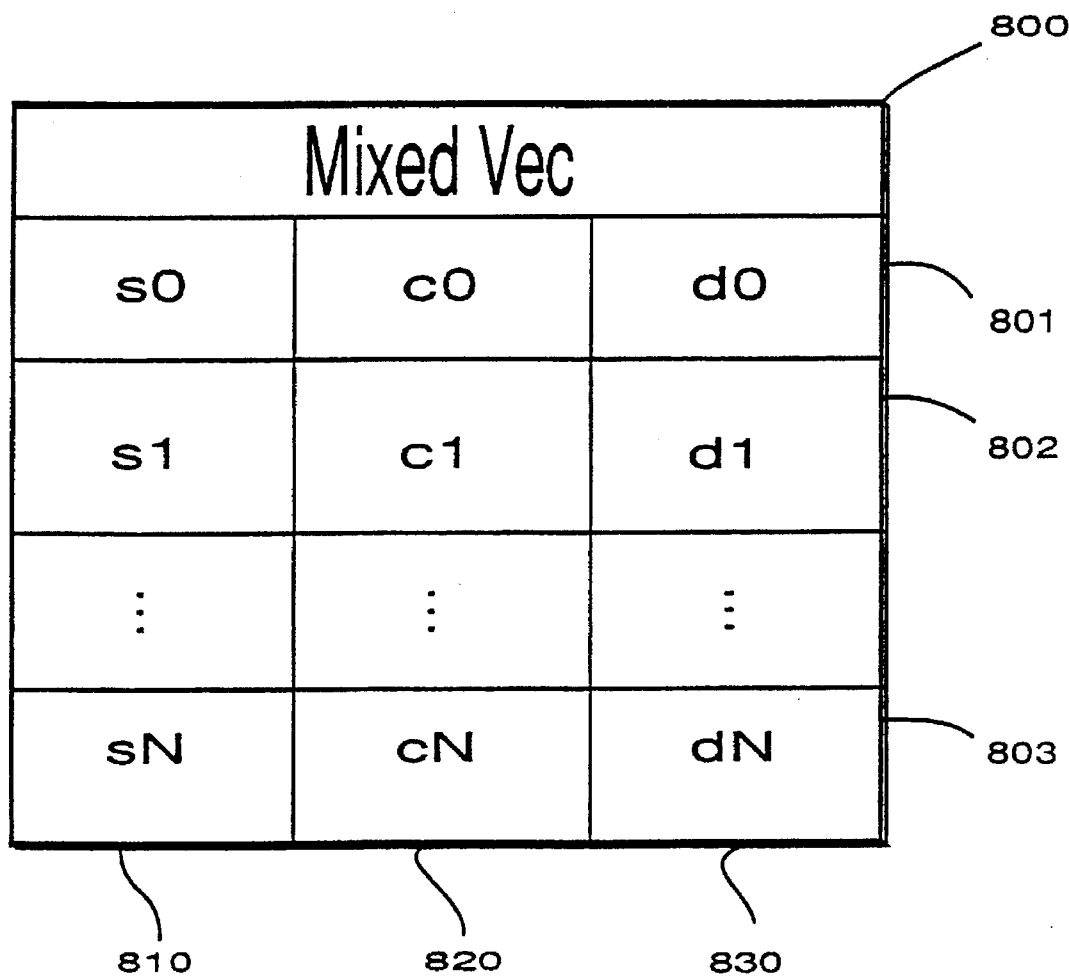

As shown in FIG. 8, a MIXED predicate vector (MixedVec) 800, comprising the rows 801–803, may be maintained. The first value of an entry of the MIXED predicate vector, column 820, stores a pointer to the machine executable code to be used to evaluate the corresponding MIXED predicate, for example, c0, . . . , cN. The machine executable code can be produced during the compiling step 320. The second value of each vector entry, column 830, stores a pointer to data structures used to evaluate the vector, for example, d0, . . . , dN. Each entry in the MixedVec 800 is pointed to by the off-set stored in the mixed_pointer sub-field 455 of the corresponding node field in the BoolVec 450.

Figure 9:
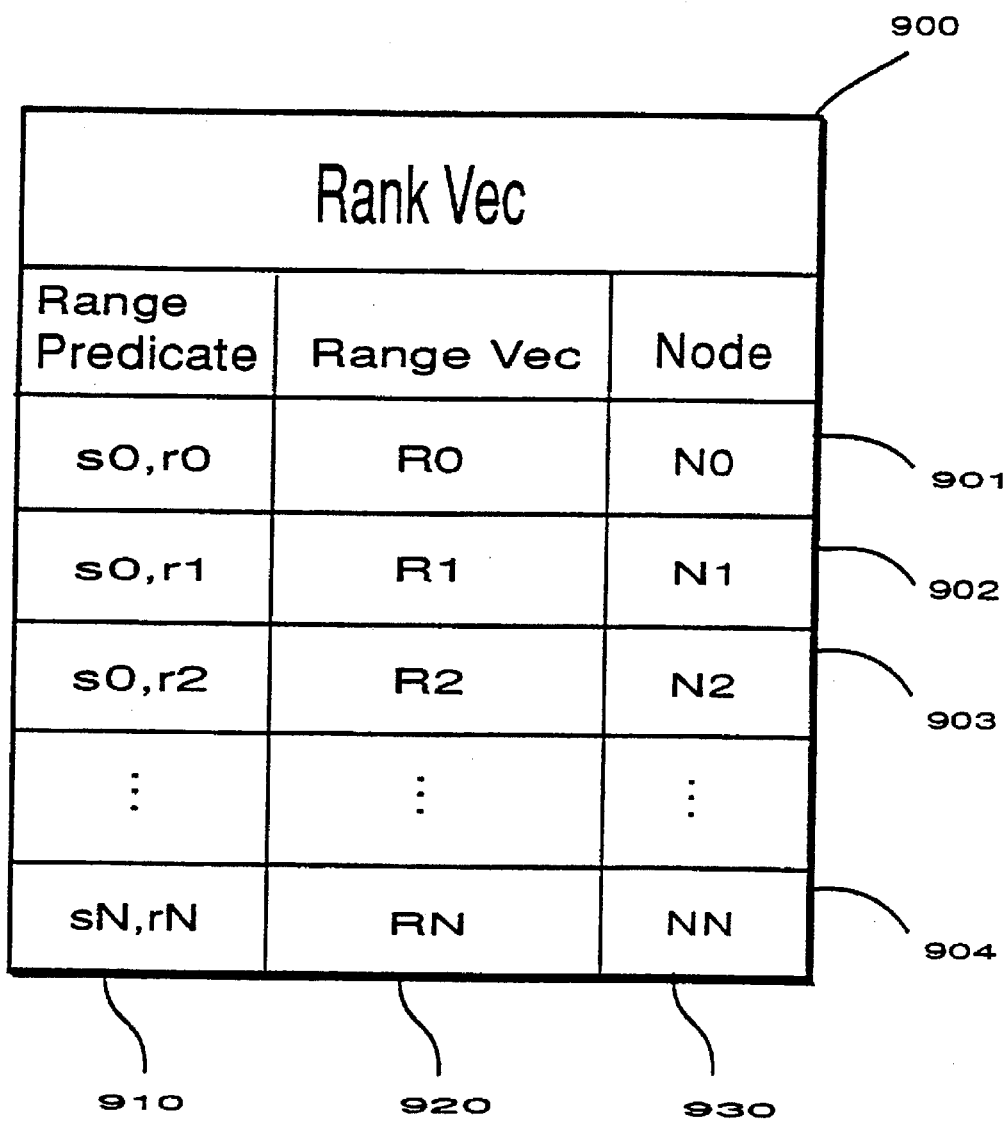

A rank vector (RankVec) 900, comprising the rows 901–904, may be maintained as shown in FIG. 9. The first value of each rank vector 900 entry, column 920, stores a pointer to the corresponding RangeVec 700, for example, R0, . . . , RN. The second value, column 930, stores a pointer to the data structure of corresponding node in the BoolTree 400, for example, N0, . . . , NN.

Each node, e.g. the data structure representing the RANGE-type of the BoolVec 450, includes a pointer in the form of an off-set to the corresponding entry of the RankVec 900. This establishes a bi-directional link between the BoolVec 450 and the RankVec 900 for each range producing predicate.

The data structures associated with the SegmentVec 500, MixedVec 600, and RangeVec 700 do not change substantially during the binding and executing phases of query processing. However, the data structures of the RankVec 900 and the BoolVec 450 can change substantially during value binding and executing. Therefore, in the preferred embodiment, copies of the later two data structures are saved after creation, so that they may be used for each subsequent instant of use after compilation.

Having produced the data structures for the BoolTree 400, and the vectors 600, 700, 800, and 900, the next phase of query processing can commence.

Optimization During Value Binding Phase

During value binding, the external context necessary to begin scanning the index becomes available. For example, the initial values of the ranges or semi-open ranges are known. Therefore, the low_value and the high_value of each semi-open range can be stored in the appropriate entries of the RangeVec 700.

After the values are "bound" to the RANGE predicates, each group of range entries for a particular segment of the RankVec 900 is sorted in an ascending order of the associated semi-open ranges, using the pointers of column 920 to the corresponding RangeVec 700. After sorting, the off-set position of RankVec 900 for a particular segment is a single integer value or "rank" of the corresponding RangeVec 700. The "rank" is also stored in the corresponding leaf or predicate node of the BoolTree 400 using the corresponding RANGE-type leaf node.

In addition, for each segment the limit_key value is initialized to the lowest possible ranking value, for example zero, as shown in column 640 of FIG. 6.

Optimization of the BoolTree 400, from this point forward, is done according to ranks, instead of by actual ranges. A substantial reduction in processing time is possible due to this arrangement. Indeed, since each rank corresponds to a segment range, for example ranges 520 and 550 of FIG. 5, the Boolean B is evaluated to the same logical TRUE or FALSE condition for the range. Therefore, it is sufficient and more expedient to use a range identifier, e.g., the "rank", instead of the values associated with the semi-open range.

For example, considering a query which is composed as:

$$s0=2 \text{ AND NOT } (s1 \text{ BETWEEN } 5 \text{ and } 7) \text{ OR } s0+s1=0.$$

After compile-time normal form reduction, as described above, this query is equivalently expressed as:

$$(s0=2 \text{ AND } (s1<5 \text{ OR } s1>7)) \text{ OR } s0+s1=0.$$

Figure 10:
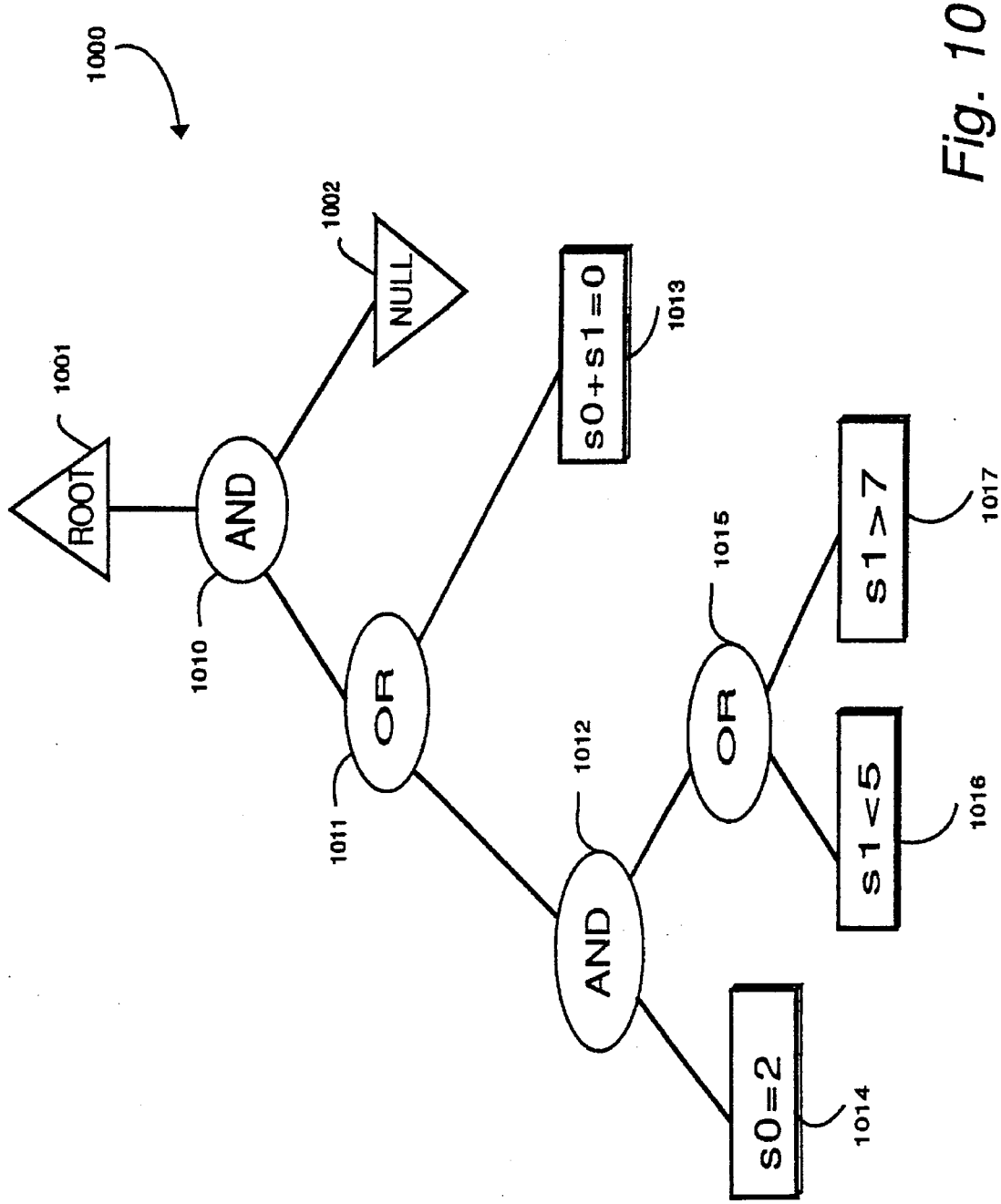
FIG. 10 illustrates a tree of a Boolean restriction to be optimized.

A corresponding Boolean tree in canonical form 1000 is shown in FIG. 10. The tree 1000 has a root 1001. There is an AND node 1010 at a top level. At a first level are an OR node 1011 and a "null" node 1002. At a second level there are an AND sub-expression node 1012 and a MIXED predicate node 1013. At a third level there are a RANGE predicate node 1014 and an OR sub-expression node 1015. And, at a fourth level are RANGE predicate nodes 1016 and 1017.

A convenient form to display the BoolVec 450 which could be used for the visualization of the BoolVec of the tree 1000 is shown in tabular form in FIG. 11. Each of the rows 1101–1108 of the table 1100 corresponds to one of the nodes 1001, 1011–1017 of the tree 1000, e.g. nodes n0–n7 of column 1110. Column 1120 indicates the "levels" of the tree 1000. Column 1130 indicates the child_operator which operates on the children nodes at the level. Note that the operators alternate between conjunctive AND and disjunctive OR operators at adjacent levels. Column 1140 indicates the type of node as defined with reference to column 451 FIG. 4B. Column 1150 indicates the segment-number sub-field, e.g., s0, s1. Column 1160, for RANGE nodes, indicates the range ranks, e.g., k0–k3. Column 1180, for sub-expression nodes, indicates child_pointer to the descendant (child) nodes of the parent node at this level.

Prior to executing the query, for example, during the binding phase 330 of FIG. 3, the Boolean tree may be farther optimized to decrease the number of processing steps such as I/O operations. The pre-execution optimization can be performed by a single "tree-walk" sorting the sibling nodes encountered and performing node collapse and removal during the traverse.

During the tree walk, starting at the root, immediately descend to the first child node of each parent node visited, until a leaf node is reached. Optimize the leaf node. When a leaf node has been optimized, move to the next sibling node at that level. If there are no more sibling nodes, ascend to the parent sub-expression node and move to the next node at that level.

Therefore, all optimization activities take place upon the sibling nodes before ascending the tree to a parent sub-expression node. For example, sibling nodes are sorted before ascending to the parent node. If the sibling nodes are stored in physically adjacent memory locations, they can be rapidly sorted in place. The nodes are sorted as follows. For sibling nodes, RANGE nodes precede MIXED nodes, which precede sub-expression nodes. For each node, the segments are sorted in ascending order. For each RANGE node, the nodes are sorted in a low-to-high order of the associated ranks of low range values.

Figure 12:
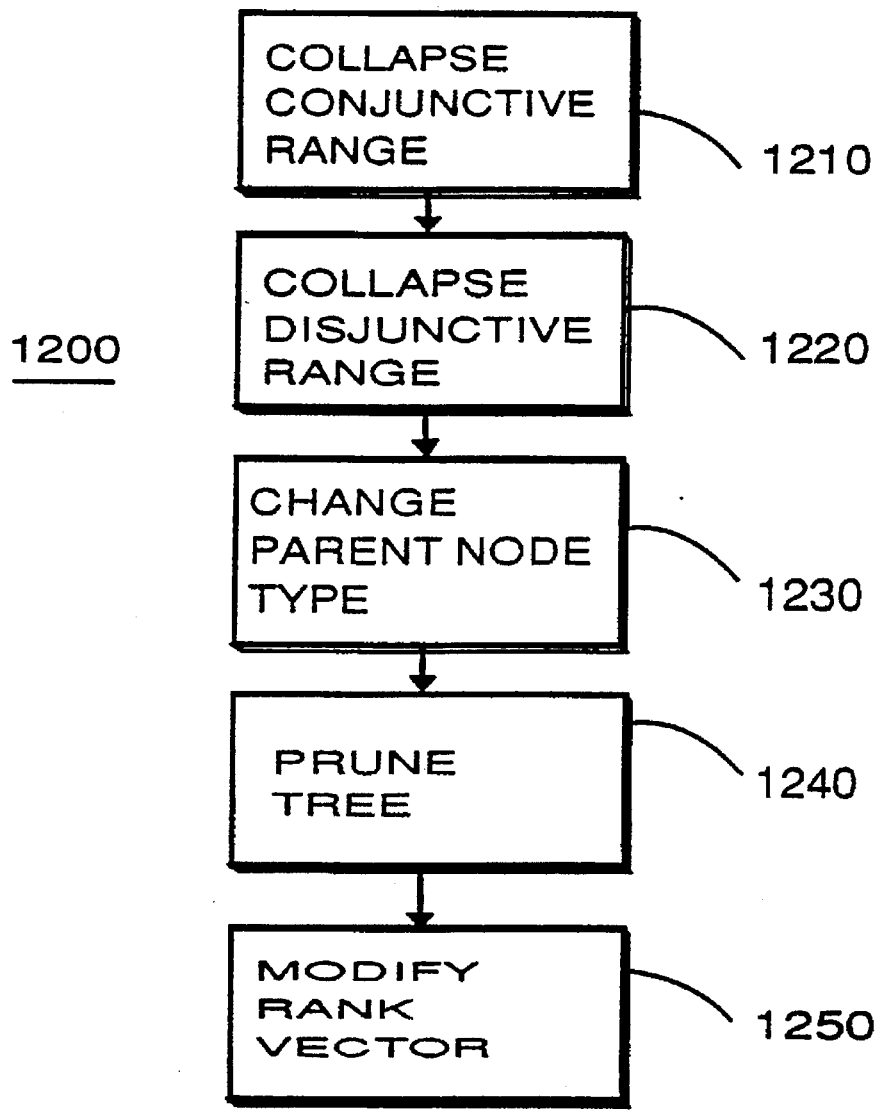
FIG. 12 is a top level flow diagram of optimizing steps performed on the Boolean restriction.

FIG. 12 summarizes an optimizing procedure 1200 that can be performed during the tree walk. In step 1210, any conjunctively connected sibling RANGE nodes including the same segment have the ranges of the shared segment collapsed into a single intersecting range. The low_value of the intersecting range is the maximum low_value selected from the low_values of the collapsed ranges. The high_value of the intersected range is the minimum high_value of the collapsed ranges. Thus, the single intersected range replaces the group of ranges. If the intersected range is empty, the sibling nodes can be removed. If the intersecting range is all-inclusive, the range can be removed.

Similarly, in Step 1220, any disjunctively connected sibling RANGE nodes including the same key segment are optimized. All empty ranges are removed. Pairs of ranges having immediately adjacent or intersecting values are collapsed by a union of the ranges. If an all-inclusive range is produced, the sibling nodes are removed. Otherwise, an ascending group of non-empty ranges is produced.

After collapsing of ranges, in step 1230 the node type may be changed from SUB-EXPRESSION to either IGNORE-ALL or IGNORE-ONE as follows. If the last sibling node which was removed had an all-inclusive range, in the conjunctive step 1210, or if the last sibling node which was removed had an empty range in the disjunctive step 1220, an OR case, the parent node type is changed to IGNORE-ALL to indicate an intent to subsequently remove the parent node and all its siblings. Otherwise, if all the sibling nodes were dropped, the parent node type is changed to IGNORE-ONE to indicate an intent to remove the parent node.

The node types RANGE, MIXED, SUB-EXPRESSION, IGNORE-ONE and IGNORE-ALL are stored in the node_type sub-field of BoolTree as numbers 0, 1, 2, 3, and 4 correspondingly. Then, after the type of parent node is changed to 3 (for IGNORE-ONE) or 4 (for IGNORE-ALL), the sort of the parent's siblings performed at the ascent to the parent will bring all "ignore" nodes to the end of the sibling chain.

Then, in Step 1240, the tree is pruned as follows. Immediately after sort, the last sibling is checked on being IGNORE-ALL, and, if it is so, all siblings are dropped and their parent is marked as IGNORE-ONE. Otherwise, if the last sibling is IGNORE-ONE, drop this last sibling along with all preceding siblings that have IGNORE-ONE type. After that, the left-to-right optimization of siblings proceeds as normal.

If one of the "IGNORE" types has been propagated to the root node, the entire tree is evaluated as having a constant logical value. For a constant TRUE condition, the entire index is to be scanned, delivering every key. For a FALSE condition, the scan can be skipped, since no keys satisfy the Boolean restriction.

As described above, optimization of the Boolean tree may remove some of the nodes. If any nodes are changed or removed the corresponding entries in the rank vector 900 must likewise be changed or removed. In step 1250, any "loose" entries of the rank vector 900 are removed. And, any entries of the rank vector 900 which are bound to the same range can be collapsed to a single vector entry. These two tasks can be performed by scanning the RankVec 900 for each segment, removing "loose" and duplicate entries, and updating the ranks of the remaining entries accordingly.

Pre-Execution Optimization

To reduce processing time while optimizing during the compiling and binding phases, the data structure representing the tree is preferably kept as small as possible, for example, eight bytes. Small data structures can be manipulated more efficiently. However, while executing the query, while the tree is static, a fast and economical scan of the index requires additional information. Therefore, the nodes of the tree may be expanded to accommodate this additional information, as described in greater detail below.

Figure 13:
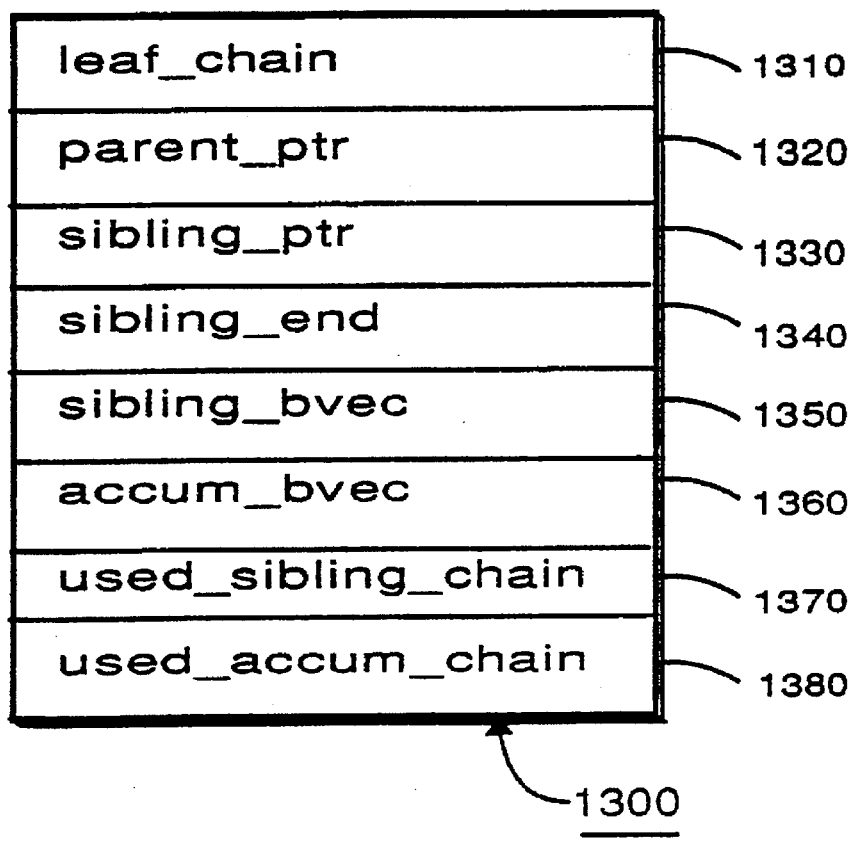
FIG. 13 shows node descriptor fields used while executing queries.

As shown in FIG. 13, in preparation for executing the query, the in-memory data structures representing the nodes are expanded to include pointers and flags 1300 to accelerate evaluating and scanning the tree.

A leaf_chain field 1310 stores a pointer which links all predicate nodes of a particular segment of a key, for example all nodes associated with the first segment s0. For the last node in the chain, the leaf-chain field 1310 stores zero. The first node in the chain is pointed to from the corresponding entry of the segment vector 600.

A parent_ptr field 1320 stores a pointer to a node which is the parent of the node. For the root node 401 of the tree, the parent_pointer field 1320 stores a "null" value, e.g., zero.

For the RANGE-type node, a sibling_ptr field 1330 stores a pointer to the next position after the last RANGE node having a segment in common with this node. If the node is a MIXED or a SUB-EXPRESSION node, the sibling_ptr field 1330 stores a pointer to the next sibling node position.

A sibling_end field 1340 stores a flag to indicate whether a sibling node in a group of nodes having a common parent node is the last sibling node. For example, the sibling field 1340 can store a "1" for the last sibling node, and a "0" for all other sibling nodes in the group.

A sibling_bvec field 1350, as a bit vector, stores flags which indicate whether or not the individual key segments of the node have been logically evaluated. The flags can be stored as a bit vector with a "1" bit value indicating that the corresponding key segment has been evaluated, and a "0" bit value indicating that the corresponding key segment has not been evaluated.

An accum_bvec field 1360 stores, as a bit vector, flags which indicate the accumulated logical conditions of the entire group of siblings of a particular parent segment. This field can be used to determine, for example, if all disjunctively associated nodes of the sibling group are logically evaluated as a FALSE conditions, or if all conjunctively associated nodes are evaluated as TRUE.

An used_sibling_chain field 1370 stores a pointer which links all sibling nodes of a particular key segment having corresponding flags in the sibling_bvec field 1350. Marked meaning the bits of the sibling_bvec field 1350 having been set to a "1" due to Boolean evaluation. The last node in the chain contains zero. The first node is pointed to from the corresponding entry in the segment vector 600.

An used_accum_chain field 1380 stores a pointer which links all sibling nodes of a particular key segment having corresponding flags in the accum_bvec field 1360 marked, e.g., "1". The last node in this chain contains a zero, and the first node is pointed to from a corresponding entry in the SegmentVec 600.

In most relational databases, only a small number of leading segments of a compound key are used to uniquely distinguish a key. The remaining key segments are typically used to provide alternate access paths to the dam associated with the key. Taking this practical situation into consideration, storage space can be conserved, and bit manipulations can be expedited by limiting the bit vectors fields 1350 and 1360 to, for example, sixteen or thirty-two bits. Thus, the bit vector fields can be evaluated quickly by logical machine code instructions which operate on, for example, two or four byte fields.

In the bit vector fields 1350 and 1360, the "i"th bit is associated with the "i"th segment of the key. For example, bit 0 is associated with segment s0, and so forth. The last bit or high order bit of the field is reserved as a starting indicator during "bit accumulation" described further below. For the first sibling node in a group of nodes having a common parent node, the last bit of the accum_bvec fields 1350, for example, bit 15, is initialized to a "1". All other bits of all other bit vector fields are initialized to a "0".

With the expanded Boolean tree with pointers and flags as detailed above, the logical evaluation of the key segments, and the propagation of the logical conditions derived from the evaluation will now be described, first generally, and then with specific reference to a preferred implementation.
Optimization During the Executing Phase Executing the query is performed by a scan driver and an evaluator. The scan driver issues a sequence of requests, "get-next-key" to deliver index keys from the selected index. The index keys are evaluated to determine if the key values satisfy a given query restriction. In the invention, the scanning of the index is optimized to skip all ranges in the index for which the predicate evaluates to a logical FALSE condition. Also, while scanning the index, any range of the index for which the query predicate predictably evaluates to a logical TRUE allows for the predicate evaluation on individual keys to be avoided. In addition, only partial evaluation takes place for any ranges where the leading key segments of the key have the same values as the current and previous keys.

The evaluator determines the logical TRUE or FALSE condition for each segment of the key. In addition, the evaluator produces the "limit_key". The "limit_key" key has a value which has the same logical TRUE/FALSE condition for any key between the current key being evaluated and the limit_key, excluding the limit_key itself.

The general principles of the scan driver and evaluator will be first explained with an easy to understand example. Preferred implementation details follow the simple example.

For example, a compound key K having three segments s0_s1_s2, and an index I populated with:

$$s0=(i/10)*10)$$

$$s1=(i/2)*2$$

$$s2=i$$

for i=0, 1, . . . , 11. A Boolean restriction is defined as:

$$(s1=0 \text{ OR } (s1=10 \text{ AND } s2=11),$$

with no restrictions for segment s0. The scan of the index, and the evaluation of the key values during the scan is explained with reference to FIG. 14.

In FIG. 14, in tabular format, the rows 1401–1411 represent the first twelve keys of the index populated as above. Column 1420 shows the keys in sequential order. Columns 1432, 1433 and 1440 show the key values for segments s0, s1, and s2 of the index keys. Column 1450 show the Boolean values, TRUE or FALSE for the keys with respect to the specified Boolean restriction. Column 1460 shows the current limit_key value, and column 1441 shows whether the key is evaluated or skipped.

At the start of the scan, the scanning component issues a "get-next-key" request which returns the lowest possible key stored in the index, a key having the concatenated values (0_0_0), for example. Evaluation of this current key returns a TRUE condition and a limit_key having a value of (0_1_0). Since the current key evaluates to TRUE, the scan component issues "get-next-key" requests until the value of the delivered key becomes greater than, or equal to the value of the limit_key. For example, the key k1 is fetched but not evaluated. However, the next key (k2) which is fetched has a value greater than the current limit_key value, therefore k2 is evaluated.

The evaluation of k2 produces a FALSE Boolean value and a new limit_key of (0_10_11). Upon discovering a FALSE value for the key, the scan component makes a request for the next key having a value greater than or equal to the "limit_key" key, skipping intervening keys k3–k9. The next key which is delivered is k10 having a value (10_10_10), which is evaluated as FALSE, and which prompts the establishment of a new limit_key limit having a value (10_10_12), and so forth.

Conventional "OR optimized" index scans are incapable of skipping through the index as in the example above. OR optimization for index scans requires that all key ranges comprise an "OR" range list in order to have a range or identity, e.g., "=", specified for the leading segment (s0) of the key. The present invention does not impose any such limitations on the Boolean expressions. In fact, the range-based optimizer of the present invention will exploit any optimizing opportunity which may arise in any given set of compound index keys.

Furthermore, if the index only stores a small number of different values pertaining to the leading segment of the key, as in the above example, then the skip strategy of the present invention becomes very efficient for Boolean restrictions, as shown in the above example, skipping over large portions of the index, and saving many physical I/O operations. However, should the values of the leading segment of the index keys be all different, no skips can be performed.

Fortunately, in an alternative embodiment of the invention, described in detail below, skips and absences of skips are detected. Mechanisms are provided to switch between "skip" mode and "quick evaluation" mode. This switch mechanism allows the range-based optimization of the present invention to be adapted to traditional frequency or other known optimization techniques.

Scan Driver

The traversal of the database indices is performed by the scan driver. The scan driver obtains keys from the database, and passes the keys to the evaluator. The evaluator determines if the value of the key satisfies the Boolean restriction. If the value of the key does satisfy the Boolean restriction, a TRUE condition is returned, otherwise, the evaluator returns a FALSE condition. As will be explained in more detail below, evaluation of a key also produces the limit_key for the key. In short, the limit_key has a rank limit-rank equal to the rank of the range higher than the range including the value of the current key. The limit_key is used to accelerate processing of the query.

Figure 15:
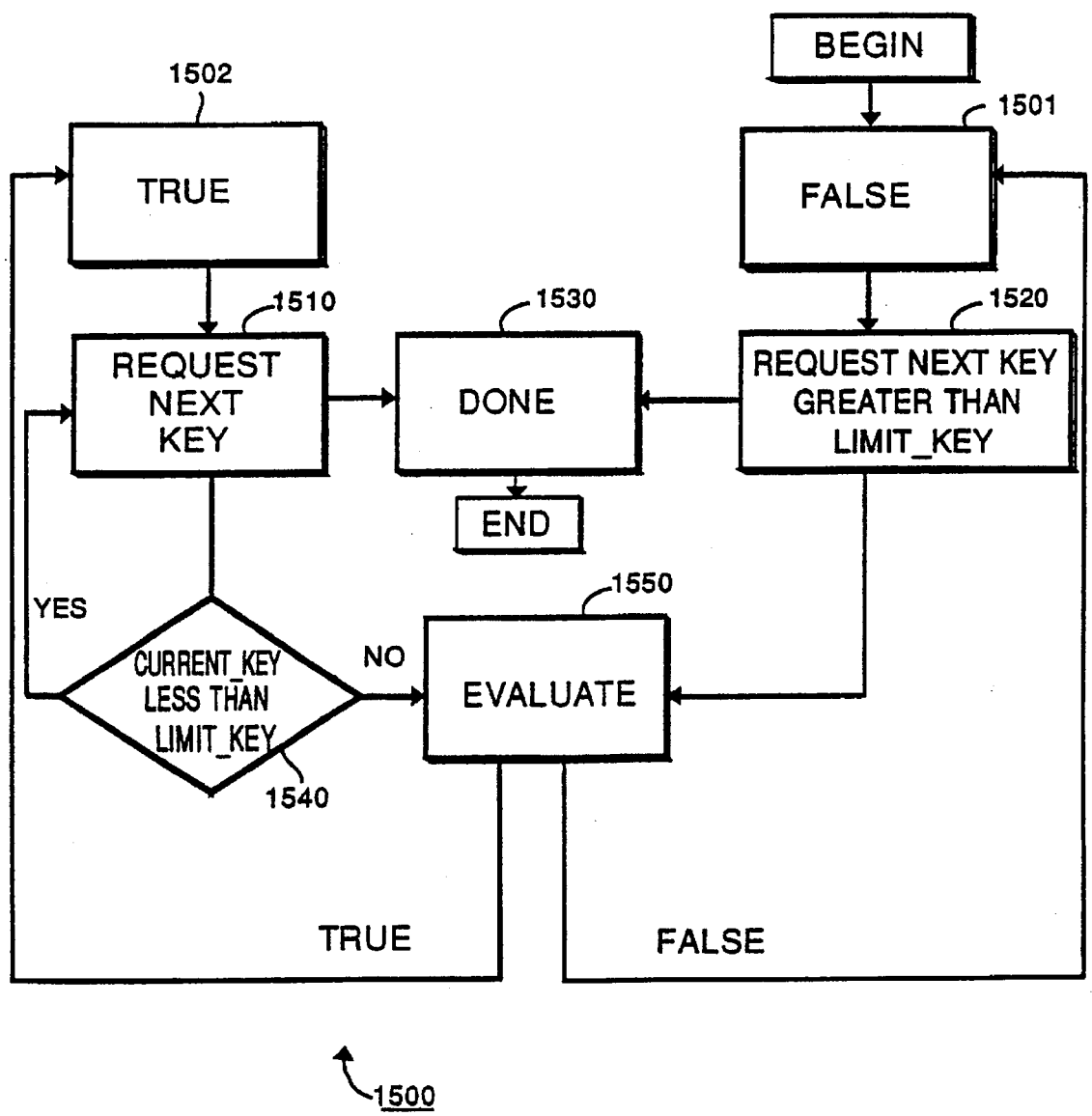
FIG. 15 is a flow diagram of a method for scanning the index of FIG. 2 according to the invention.

FIG. 15 shows a method which can be used by the scan driver to traverse an index of the database 160. The scan driver has two entry points, one entry point 1501 is used if the current Boolean value is FALSE, and the other entry point 1502 is used if the current Boolean value is TRUE.

At the start of scanning a particular index, it is presumed that the "current" Boolean value is FALSE, and the limit_ key value has a value which is smaller than any possible key value. The first key that is delivered in response to the "get-next-key" is the first or "lowest" key stored in the index. For example, key k0 of FIG. 14.

If the Boolean condition of the previously evaluated key is FALSE, in step 1520, the scanner requests the delivery of the next key having a value which is equal to or greater than the value of the limit_key. If there are no more keys to be obtained, terminate the scan in step 1530. Otherwise, make the new key the current key, and evaluate the key in step 1550.

If the logical condition of the last evaluated key is TRUE, in step 1510 request the next index key. If there are no more keys to be obtained, terminate the scan in step 1530. Otherwise, make the new key the current key, and in step 1540, compare the value of the current key with the value of the limit_key. If the value of the current key is less than the value of the limit_key, then continue with step 1510 to get the next key. Otherwise, in step 1550, evaluate the current key.

In step 1550, the current key is evaluated with respect to the Boolean restrictions composed in the query. The details of the Boolean evaluation process are described below. In short, the evaluator determines Boolean condition of the current key, as well as a limit_key. Proceed at the entry point 1501 if the current key evaluates as FALSE, otherwise, if the key evaluates as TRUE proceed at entry point 1502.

Boolean Evaluation

During execution, the Boolean evaluator establishes the Boolean condition for some, but not necessarily all nodes of the BoolTree 400 as either a TRUE or FALSE condition. The nodes are evaluated in the order that the segments appear in the key, first segment s0, then segment s1, and so forth, and finally the last segment sN. The logical TRUE/FALSE condition of each node evaluated for a given key segment is propagated to the sibling nodes, and from the last sibling node up the tree to parent nodes as long as a definite TRUE or FALSE condition can be determined.

All intermediate results of the segment evaluations are stored in the nodes of the tree as single bit logical flags, for example, a "0" indicating a logical FALSE condition, and a "1" indicating a logical TRUE condition. This arrangement allows for the partial re-evaluation of logical conditions. The flags, while partially re-evaluating a portion of the tree, can be used to avoid the re-evaluation of key segments having values which remain unchanged.

A current key may include leading segments having values in common with the values of the previously evaluated key. For example, see the description of the sample keys shown in FIG. 14. By convention here, the common_ segment is defined as the highest segment in the group of contiguous leading segments which are common between the previously evaluated key and the current key to be evaluated. Also, by convention, a result_segment is defined as a segment at which the evaluation of the previous segments delivers a definite TRUE or FALSE condition. If there are no segments having values in common with a previously evaluated key, then the result_segment is the first segment, there is no common_segment defined.

Boolean evaluation of the key is done by a partial evaluation of the segment higher or right adjacent to the common_segment. In case where there is no common_ segment the evaluated segment is the first segment s0. Then, the next segment and following segments of the key.

After partial evaluation, the sibling_bvec 1350 and accum_bvec 1360 for some of the nodes of the tree have been marked. Also the limit_rank for constructing the limit_key is maintained and stored in the corresponding entry of the SegmentVec 600.

For a particular segment, the segment value is provided in response to a get-next-key request. The "rank" of the segment value is determined by, for example, a binary search of the RankVec 900. In the case of the lowest or left-most segment of a compound key, the initial Boolean condition, as was stated above, is assumed to be FALSE. For any higher key segment, partial Boolean evaluation has been performed for all lower segments of the key.

The partial Boolean evaluation of the particular segment is done by following the corresponding leaf-chain_ptr 1310 from leaf node to leaf node where the segment is used, until the end of the chain is encountered. The end of the leaf chain is the node where the leaf_chain_ptr 1310 stores a zero. The start of the leaf chain is pointed to by a pointer in the corresponding entry of SegmentVec 600. All the segments are evaluated in turn, s0, s1, . . . , sN.

During the process of the individual segment evaluation, the Boolean condition of the individual leaf node in the chain is determined. Then, if possible, the Boolean conditions of the parent nodes, and grand-parent nodes are determined, until the root node is reached, in which case the entire tree has been evaluated. It is guaranteed during evaluation of the highest or right_most segment, that the root node is going to be reached.

To ensure the proper interpretation of the bit vectors, the bits pertaining to the current segment being evaluated must be cleaned-up before traversal of the leaf chain commences. This clean-up is achieved in cooperation with the used_ sibling_chain field 1370 and used_accum_chain field 1380.

At the start of index scan, the high-order bit in each of these fields is set to "1" for the first child of each parent. All other bits in all sibling_bvec 1360 and accum_bvec 1360 are set to "0". Also, in SegmentVec 600, all pointers to the start of used_sibling_chain 1370 and Used_accum_chain 1380 are set to zero in order to indicate the absence of a chain.

In summary, evaluation for each segment is performed as follows. For a given segment s0, s1, ..., sN, traverse the nodes as indicated by the chain of pointers in the used_sibling_chain 1370 and the used_accum_chain 1380, and set the bits in the bit vectors corresponding to the segment to "0". Then, in SegmentVec 600, zero the pointers to indicate that these chains are empty.

For the given segment, traverse the leaf nodes as indicated by the chain of pointers in the leaf_chain 1310. At each leaf node, perform the indicated Boolean evaluation. Then, propagate the Boolean condition from this leaf node up toward its parent and further towards the root while determination of a definite TRUE or FALSE conditions remains possible. At the leaf node and interior nodes touched during propagation, set necessary bits in bit vectors to "1" to indicate the propagation trace and also insert each node with such "1" marking into the appropriate "used" chain to facilitate the described above cleaning.

Boolean Evaluation of RANGE Nodes

A key segment S has a value V and a rank K, and the current node being evaluated in a chain of nodes is a RANGE node. The current RANGE node, as part of Leaf_chain, is always the first node among the continuous stretch of siblings having a common segment and being terminated at the position conveniently pointed to by sibling_ptr. Recall that these siblings represent an ordered non-overlapping set of ranges. Since Boolean evaluation of segment values is done with respect to the "rank" of the segment range and not the actual range values, it is necessary to determine the relative position of the rank K of the segment S with respect to the low-rank and high-rank, columns 453–454 FIG. 4B, of the same segment in any sibling nodes.

This determination can be made by a binary search of the sibling nodes within the stretch for the right-most node which low_rank does not exceed K. By convention, if the rank K of the segment S is lower than all low_ranks in the stretch, K is assumed to fall into the left-most gap. After such matching node is found, the high_rank sub-field in that node is compared with the rank K of segment S, to determine if V falls within the current range or the immediately following "gap". A gap is the interval of key values between the current range high_rank, and the next range low_rank specified in the range vector for the segment.

As a result of the binary search, it is possible to determine the Boolean condition of the rank K of segment S, e.g., indirectly the TRUE or FALSE condition of V. The limit_key can also be determined. The value of the limit_key is the next possible segment value after the matching range or gap into which the current segment value falls. The segment S value of the limit_key also has a corresponding rank.

Boolean Evaluation of MIXED Nodes

If the current node N is not a RANGE node, e.g., a MIXED node, simply evaluate V, using if necessary, the segment values of lower segments, which must be available at this point. Thus, the Boolean condition of the MIXED node is derived. Note that the MIXED node evaluation does not contribute to the limit_key determination. To indicate this, the segment S limit-key value is set to zero.

The Boolean condition of the leaf nodes can be used for Boolean evaluation of AND and OR operations among sibling nodes. The resultant Boolean condition of a group of sibling nodes can be propagated up the tree to parent nodes while a definite evaluation remains possible. The limit_key is maintained until the end of Boolean condition propagation so that it can be used to determine the "near-largest" range for which the Boolean condition is constant The detection of the near-largest range is explained below.

Boolean is FALSE Propagation for Disjunction

If the Boolean condition of a leaf or parent node N is FALSE and the node N is connected to its sibling nodes by the OR operator, then, only if all other sibling nodes evaluate to a FALSE condition does the disjunction yield a FALSE condition, otherwise uncertainty remains.

Node Marking

In order to propagate the Boolean conditions of disjunctively connected sibling node in the accum_bvec field 1360, two bit vectors are used for each key segment as shown, by way of example, in FIG. 16. For each segment of the key, a vector segment_flag 1610 stores a "1" at the bit position corresponding to the segment, and "0" at all other positions. For example, FIG. 16 shows the segment_flag 1610 for segment s3 of a key. Segment-flag 1610 stores a "1" in the fourth bit position, the first bit position is used for segment s0. A vector segment_mask 1620 stores a "1" at the last position of the vector, and at all positions below, and including the position corresponding to the segment.

The content of the accum_bvec field 1360 of the current node is ANDed with the content of the segment_mask 1610. If the result is a zero, the following propagative actions are taken. The content of the accum_bvec field 1360 is ORed with the content of the segment_flag 1610. The current node N is added to the used_accum chain field 1380. The limit_key 640 in the corresponding entry of the SegmentVec 600 is replaced with the current limit_key as determined above. Propagation of the Boolean condition started at some leaf node is terminated.

If the result of the masking operation is not zero, and, if the sibling_end flag 1340 stores a "0", e.g. the current node is not the last node in a chain of sibling nodes, the next node pointed to by the pointer in the sibling_ptr field 1330 is made the current node. Otherwise, the entire conjunction is FALSE, the containing disjunction is FALSE, and the conjunctive parent node is evaluated as having a Boolean FALSE condition. The grand-parent node is made the current node, and mark the sibling_bvec field 1350 as described above. Note that this process evaluates two levels of the tree.

ANDing the accum_bvec field 1360 with the segment_mask 1620 is an efficient way of eliminating extraneous accumulated bits before the Boolean evaluation of segments higher than the current segment S. Also, it should be observed that initializing the high bit, e.g. the 15th bit, in the sibling_bvec field 1350, as described above with reference to FIG. 13 is necessary to cause proper accumulation in the segment_flags 1610 of sibling nodes following the current node, enabling a correct all-FALSE overflow in the accum_bvec field 1360.

In the case where the current node of a disjunction is evaluated as FALSE, during the course of upward propagation of the Boolean condition and the limit_key, the sibling_bvec 1350 field is marked as follows.

If any of the bits in the sibling_bvec field 1350 are set to a "1", while processing index segments lower than the current segment, then, propagation may is terminated without changing the value of the limit_key. Propagation is terminated because the Boolean condition evaluated at some lower segment has already been done and is independent of the Boolean condition of the current segment.

If the bit corresponding to the current segment in the sibling_bvec field 1350 is set to a "1", while processing the current segment, then, the limit_key of the segment is replaced with the lower one of either the low_rank of the segment, or the propagated limit_rank.

If the sibling_bvec field 1350 does not have any bits set, e.g., it may be set at or below the current segment position, e.g., sibling_bvec ANDed with segment_mask is zero, then perform the following actions.

The contents of the sibling_bvec field 1350 may be replaced with the contents of the segment-flag 1610. The current node may be added to the used_sibling-chain 1370. And, if the current node is the root node or a child of the root node, the entire Boolean evaluation may be terminated. Otherwise, for any node at another level of the tree, the accum_bvec field 1360 can be marked as evaluated.

The purpose of having a single child 411 of the root node 401 as illustrated in FIG. 4 should now be apparent. It is more efficient to ascend the tree to a grand-parent node during Boolean evaluation, crossing two tree levels in one step, and checking for evaluation completion only once. Having a root with a single child node guarantees the existence of a grand-parent node during tree evaluation.

Boolean is TRUE Propagation for Disjunction

If the Boolean condition of a current disjunctively connected leaf node, or the condition which is being propagated is TRUE, then, the parent node can be made the current node, and the sibling_bvec field 1350 can be marked as described above.

Boolean Propagation for Conjunction

Propagation of Boolean conditions for conjunctively connected nodes is may be done in a symmetrical manner to the disjunctive descriptions given above using the complementary Boolean values.

Increasing Range Sizes

The Boolean evaluation and propagation procedures described above determine the limit_key for each key segment individually, first key s0, then s1, and so forth. In other words, the Boolean evaluation and rank determinations of any one segment are done independently of the evaluation of any other segment.

However, there the invention makes possible the potential to determine a set of "better" limit_keys for the segments of the Boolean restriction. That is, there may be a "near-largest" range such that any key in the near-largest range evaluates to a constant Boolean condition, e.g., either always FALSE, or always TRUE.

The near-largest range can be created by concatenation of all adjacent ranges that are evaluated to the same Boolean condition.

For example, consider a Boolean restriction:

(s0=1 AND s1=1) OR (s0=5 AND s1=5), and a new key having a value:

s0_s1=1 ||2 where "||" means the concatenation of the key values of the segments, i.e., s0=1, and s1=2. The values corresponding to the limit_ranks are 2 for s0, and HV for s1. During evaluation of the Boolean restriction it has been determined that for the semi-open range [1||2:1||HV) the Boolean condition is constant, for example always FALSE. At this point it is advantageous to evaluate the next key following this range, e.g., the key having a value of 2||0. And, indeed, for segment s0, the evaluation of this next key yields a FALSE Boolean condition and a corresponding limit_rank of, for example 5.

Then, if the key 5||0 is evaluated, it turns out that the Boolean condition for segment s1 is still FALSE, and the corresponding limit_rank is 5. Yet another evaluation for the key 5||5 yields a Boolean TRUE condition. Thus, the ranks associated with values of this larger concatenated range is a "better" limit_key for guarantying FALSE Boolean evaluation over the semi-open range:

[1||2:5||5).

To support the search for a near-largest range, a sequence of Boolean evaluations may be performed immediately following the Boolean evaluation. All limit-improving Boolean evaluations are done for a current limit_key which increases from iteration to iteration. As usual, common_segment is defined as the highest segment in the group of contiguous leading segments which are common between the previously evaluated key and the current limit_key to be evaluated. However, here, unlike when the new key is obtained from the index, the limit_key segments following the common_segment are represented by segment ranks, not values. Segment values are determined during evaluation from the RangeVec using the pointers of the RankVec 900.

Consequently, at each limit-improving iteration, before starting Boolean evaluation, new ranks for the current limit_key and a new common_segment are determined as follows. Note, the result_segment, as described above, is the segment at which the previous Boolean evaluation delivered a TRUE or FALSE condition.

A) If the limit_rank of the result_segment, as determined during the previous Boolean evaluation, is the lowest possible rank, e.g., zero, then there exists somewhere in the tree a non-range leaf node which controls the outcome of the Boolean evaluation. In this case, a near-largest range for which the Boolean condition is constant does not exist and file limit-improving iterations stop.

B) If the limit_rank of the result_segment is the highest possible rank, for example a range including HV, and the result_segment is the first possible segment of the key, e.g. segment s0, then the constant range includes all possible key values, e.g. up to the value HV. In this case the limit-improving iterations are terminated, and a) if the constant Boolean condition is TRUE an unrestricted scan of the entire index is performed, otherwise b) if the constant Boolean condition is FALSE, further scanning of the index is not required since all of the keys in the index will evaluate to a FALSE Boolean condition.

C) If the limit_rank of the result_segment is neither the lowest, nor the highest possible rank associated with segment then:
  a) the common_segment is replaced with the segment preceding the result_segment;
  b) the rank of the result_segment is set to its limit_rank; and
  c) the ranks of all segments following the result_segment are set to the lowest possible rank, e.g. zero.

D) If the limit_rank of the result_segment is the highest possible rank associated with the segment, and if the result_segment is not the first segment s0 of the key, then the common_segment is replaced with the segment preceding the result_segment, and the segment value of the new common_segment is increased by one.

Then:
  a) if the increased value of the new common_segment "overflows", e.g., the increased value is greater than HV, then, the result_segment is replaced with the new common_segment, and proceed with B) above;

b) if the increased value of the new common_segment is greater than the current range, then, the value of the new common_segment is replaced with the low_value of the next range, and the rank of the common_segment is adjusted accordingly, and the ranks of the segments following the new common_ segment are set to the lowest possible rank, and the new common segment is replaced with the preceding segment.

It should be observed that this case is likely to occur during the processing of any query including a logical identity comparison to a singular value, for example s0=1;

c) if the increased value is still within the same range, and the limit_rank is the lowest possible rank, e.g. zero, then there is some other controlling segment as in A) above, and it is indicated that there is no existing limit_key; and d) if the increased value is still within the same range, and the rank of the new common_segment is not the lowest possible, then the rank of all of the following segments are set to the lowest possible rank.

The search for the near-largest range is iteratively performed until a different TRUE or FALSE Boolean condition is detected. In most practical cases, the search only requires a small number of iterations. However, in order to prevent an endless search in the case that a near-largest range cannot be detected, the maximum number of iterations can be set to a predetermined number.

Adaptive Range-Based Query Optimization

In an alternative embodiment of the invention, the range-based Boolean evaluation as described above can be adapted to improve the scanning of indices where the values of the keys are sparsely distributed over the possible range of key values.

This can be shown for the following example Boolean restriction:

s0 BETWEEN 0 and 100 AND (s1=0 OR (s1=10 AND s2=11))

The keys which are maintained for an index having a compound key s0_s1_s2 are shown in FIG. 17. Column 1710 indicates the keys, and columns 1720, 1730, and 1740 indicate the values of the key. The rows 1701–1799 indicate the keys of the index.

In this case, determining the limit_key for each new key is not productive because each time the next index key fails beyond the limit_key of the range, determined for the current key, offering no index entries to skip, and skipping of index entries is not likely to occur.

However, the sparse stretches of the index, where skipping of entries does not occur, can be detected by counting the consecutive number of "zero-skipped" key cases.

Therefore, unnecessary determinations of the limit_key can be avoided by modifying the scanning process of FIG. 15 as follows.

Prior to scanning the index, two modes for scanning the index may be defined, namely, a first mode, Mode_A, and a second mode Mode_B, also a limit_count variable is maintained. Scanning of the index commences in Mode_A, with the skip_count initialized to zero.

While scanning the index in Mode_A, the scanner part of the invention determines the limit_keys for each key evaluated, as described above. Also, the limit_count is incremented every time when, during the search for the next key greater than or equal to limit_key, the storage subsystem detects that the satisfying key is also the next key after the current key. But, if at least one key is skipped by the storage subsystem, then the limit_count is reset to zero. If at any time the limit_count exceeds some small predetermined threshold, for example a count of 5, then switch to Mode_B.

While scanning the index in Mode_B, the scanner does not determine the limit_key for each new key evaluate. However, after some number of continuous key evaluations to FALSE value, for example after 50 FALSE iterations, reset the limit_count to zero, switch to Mode_A, and resume scanning the index to generate a "fresh" limit_key. Thus, unnecessary limit_key determinations in sparsely populated stretches of the index are avoided, to improve the processing of queries.

While the scanner is operating in Mode_B, while there is a low probability that skips will occur, any known technique of Boolean evaluation can be used, including techniques which convert the Boolean to executable code, and prior art methods which optimize the query based on the frequency of occurrences of RANGE and MIXED predicate TRUE evaluations.

CONCLUSION

In traditional query evaluations, the nodes of the Boolean tree representing the query are evaluated in a bottom-up manner. Range and non-range predicates are evaluated one by one. For disjunctive relationship of nodes, ascent of the tree to a parent node is triggered when a logical TRUE condition is obtained for a particular level of the tree. In the case of conjunctive relationship of nodes, ascent to a higher level of the tree is caused by a FALSE logical condition.

In the range-based evaluation method according to the invention, the nodes of the tree are also evaluated in a bottom-up manner. However from the foregoing it will be appreciated that there are a number of significant differences from the traditional approach.

In the range-based approach, the evaluation of the key segments is done by a binary search instead of a linear search. In a binary search, the average number of comparisons is Log n, whereas for linear searches the average number of comparisons is n/2. For typical queries, where the number of comparisons can be in the hundreds, the present invention can reduce processing time by an order of magnitude. This is significant since the byte-by-byte comparison of key values is the most intensive CPU operation during query evaluation.

In addition, a quick conversion of the two range boundary values into single 2-byte integer rank takes place. This conversion allows all further comparisons to be performed on these integer ranks instead of on the byte strings. This greatly decreases the processing time during the binding and execution phases.

The manipulation of the additional data structures, for example, the flag, pointer, and vectors, of the preferred embodiment will require some additional CPU activity. However, since these manipulations can be implemented with fast machine code instructions on in-memory data structure, this factor is insignificant when compared with the large number of physical I/O operations which are eliminated. I/O operations, even for high speed disk storage devices, have execution latencies orders of magnitude greater than machine code instructions.

The Boolean transformation done at binding time is much simpler and faster than a similar range-related transformation done during compilation time by the traditional optimizers. The reason for the speed and simplicity is that the range boundaries are bound, i.e., become constants. To achieve only a limited range-based Boolean transformation, the traditional compilers face an order of magnitude higher complexity which contributes to a substantial maintenance cost and system instability.

In the invention, evaluation of the keys is done on a segment-by-segment basis, and if there are common segments in the current and previously evaluated keys, these segments do not need to be re-evaluated. Traditional approaches usually evaluate all the segments of query expression, whether or not they may have been previously evaluated.

The method of the invention detects all ranges having a constant Boolean value, and scans or skips over these ranges in the most efficient manner. In most cases, all physical I/O operations are eliminated, and logical evaluations of ranges with a TRUE Boolean condition are avoided. The invention, for most queries detects the largest constant range using a quick to execute "limit-improving" algorithm. The algorithm usually only involves the evaluation of one, or a few segments per iteration.

Furthermore, for any Boolean restriction, even those which are not reducible to a set of disjunctive key ranges, and even those which have ranges with MIXED range and non-RANGE predicates, potential "constant" Boolean ranges are detected to reduce CPU and I/O operations if a non-empty index key sequence falls in such range.

It will be understood that this invention is not limited to selecting data from databases via an ordered index. The invention can readily be adapted to select data from any type of organized and ordered data structure including sorted vectors and linked lists. It should also be understood that the record or key values used for ordering and selecting data can be represented by bit fields of various known encodings, for example ASCII, hexadecimal, integer, and the like. Accordingly, the scope and protection of the invention is not limited except as by the following claims.

I claim:

1. In a computer, a method for selecting data from a plurality of records each record associated with a key having a key value, the keys arranged according to an ascending order of the key values, comprising:

determining, using a query, a logical condition of a key value of a key of a record of the plurality of records, the logical condition being ether TRUE or FALSE, the query including a plurality of ranges and logical operators relating the ranges, each range specifying a bounded set of key values;

identifying, using the query, an interval of key values, the logical condition of each key value in the interval of key values being identical to the logical condition of the key value of the key of the record, the interval of key values including a limit value which is greater than or equal to the key value of the key of the record; and if the logical condition of the key value of the key of the record is TRUE, selecting a set of records, the key values associated with the corresponding keys of the set of records being included in the interval of key values, otherwise, if the logical condition is FALSE, repeating the determining and identifying steps for a next record, the next record associated with a next key having an associated key value arranged in the ascending order of the key values after the key value of the key of the record;

reducing the plurality of ranges to a set of disjoint ranges; and making each of the logical operators either an AND or an OR logical operators to reduce the query to a canonical form;

expressing the canonical form of the query as a Boolean tree, the nodes and levels of the Boolean tree including a root node at a top level, interior nodes at intermediate levels, and leaf nodes at a bottom level;

representing the logical condition of the value of the key of the record by the root node, representing the AND and OR logical operators relating the disjoint ranges by the interior nodes; and representing each disjoint range by one of the leaf nodes.

2. The method of claim 1 further comprising:

relating nodes at a particular level of the Boolean tree by a first logical operator; and relating nodes at an adjacent level by a second logical operator, the first and second logical operators being different.

3. In a computer, a method for selecting data from a plurality of records, each record associated with a key having a key value, each key value formed by concatenating a plurality of attribute values, the concatenated attribute values of each key arranged in a left to right order, the keys arranged according to an ascending order of the key values, comprising;

determining, using a query, a partial logical condition of a left-most attribute value of a key of a record of the plurality of records, the partial logical condition being either TRUE or FALSE, the query including a plurality of ranges and logical operators relating the ranges, each range associated with one of the plurality of attribute values, and each range specifying a bounded set of the associated attribute values;

detecting, using the query and the partial logical condition, if the partial logical condition of the leftmost attribute value is a complete logical condition of the key value; and if the partial logical condition of the leftmost attribute value is not the complete logical condition of the key, repeating the determining and detecting steps for a next left-most attribute value, the next left-most attribute value arranged right adjacent to the left-most attribute value, otherwise, making the partial logical condition the complete logical condition of the key value;

identifying, using the query, an interval of attribute values, the logical condition of each attribute value of the interval of attribute values being identical to the partial logical condition of the attribute value of the leftmost attribute of the key of the record, the interval of attribute values including a limit value which is greater than or equal to the attribute value of the leftmost attribute of the key of the record; and if the complete logical condition of the key value of the record is TRUE, selecting a set of records, each of the attribute values associated with each corresponding key of the set of records being included in the corresponding interval of attribute values, otherwise, if the complete logical condition of the key value is FALSE, repeating the determining and identifying steps for a next record associated with a next key having an associated key value arranged, in the ascending order, after the value of the key of the record.

4. The method of claim 3 further comprising:

increasing the limit value to produce a higher limit value; and determining, using the query, the logical condition of the higher limit value;

if the logical condition of the higher limit value is identical to the logical condition of the limit value, replacing the limit value with the higher limit value.

5. The method of claim 4 further comprising:

reducing the plurality of ranges to a set of disjoint ranges; and making each of the logical operators either an AND or an OR logical operators to reduce the query to a canonical form.

6. The method of claim 5, further comprising:

expressing the canonical form of the query as a Boolean tree, the Boolean tree including a root node at a top level, interior nodes at intermediate levels, and leaf nodes at a bottom level;

representing the logical condition of the value of the key of the record by the root node, representing the AND and OR logical operators relating the disjoint ranges by the interior nodes; and representing each disjoint range by one of the leaf nodes.

7. The method of claim 6 further comprising:

relating nodes at a particular level of the Boolean tree by a first logical operator; and relating nodes at an adjacent level by a second logical operator, the first and second logical operators being different.

8. The method of claim 3 further comprising:

arranging the plurality of ranges in an ascending order of the bounded set of attribute values;

assigning, in the ascending order, a unique rank number to each range;

identifying a particular range including the interval of attribute values; and associating the corresponding rank of the particular range with the interval of attribute values.

9. The method of claim 8 further comprising:

reducing the plurality of ranges to a set of disjoint ranges; and relating the set of disjoint ranges by AND and OR logical operators to reduce the query to a canonical form;

expressing the canonical form of the query as a Boolean tree, the Boolean tree comprising a plurality of nodes arranged at a plurality of levels, the nodes and levels of the Boolean tree including a root node at a top level, interior nodes at intermediate levels, and leaf nodes at a bottom level;

representing the complete logical condition of the value of the key of the record by the root node; and representing the logical operators by the interior nodes, and representing each disjoint range by one of the leaf nodes.

10. The method of claim 9 further comprising:

associating the partial logical condition of the leading attribute value with the leaf node representing the disjoint range including the leading attribute value;

propagating, as long as the partial logical condition remains definite, the partial logical condition to one of the nodes at a higher level; and setting the complete logical condition to the partial logical condition when the partial logical condition is propagated to the root node.

* * * * *